US 6,732,026 B2

(12) United States Patent
Fleming et al.

(10) Patent No.: US 6,732,026 B2
(45) Date of Patent: May 4, 2004

(54) PARK-BRAKE MONITORING-SYSTEM FOR A VEHICLE

(75) Inventors: William R. Fleming, Fort Wayne, IN (US); Norman K. Arnold, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 93 days.

(21) Appl. No.: 10/254,278

(22) Filed: Sep. 25, 2002

(65) Prior Publication Data

US 2004/0059479 A1 Mar. 25, 2004

(51) Int. Cl.$^7$ ................ B60K 27/00; B60K 41/20; B60T 7/00
(52) U.S. Cl. .................. 701/29; 701/36; 303/191; 307/10.1
(58) Field of Search ................ 701/29, 36, 70; 188/156, 72.6, 251 A, 32, 353, 171, 155, 73.1, 72.4, 265; 74/491, 512, 534, 535, 542, 560; 303/191, 72, 84.1; 192/219.4, 35; 180/370; 307/10.1, 115, 116, 139

(56) References Cited

U.S. PATENT DOCUMENTS

| 4,278,143 | A | * | 7/1981 | Nagai | 180/282 |
|---|---|---|---|---|---|
| 4,561,527 | A | * | 12/1985 | Nakamoto et al. | 192/219.4 |
| 4,809,177 | A | | 2/1989 | Windle et al. | 364/424.01 |
| 4,921,076 | A | * | 5/1990 | Grenier et al. | 188/72.6 |
| 5,288,140 | A | * | 2/1994 | Shikata | 303/72 |
| 5,853,348 | A | | 12/1998 | Lehman | 477/96 |
| 6,263,269 | B1 | | 7/2001 | Dannenberg | 701/29 |
| 6,382,741 | B1 | * | 5/2002 | McCann et al. | 303/191 |
| 6,522,967 | B1 | * | 2/2003 | Pfeil et al. | 701/70 |
| 6,648,107 | B2 | * | 11/2003 | Lundholm et al. | 188/156 |

* cited by examiner

Primary Examiner—Tan Q. Nguyen
Assistant Examiner—Dalena Tran
(74) Attorney, Agent, or Firm—Jeffrey P. Calfa; Dennis Kelly Sullivan; Susan L. Lukasik

(57) ABSTRACT

A park-brake monitoring-system monitors the operating state of a park-brake system of a vehicle. The park-brake monitoring-system comprises operating-state sensors that produce and communicate sensed operating-state signals in manners dependent upon the operating state of the park-brake system to other components of the vehicle. The configuration and interaction with the park-brake system and the park-brake monitoring system of the operating-state sensors is refined such that the sensed operating-state signals produced thereby include signal types that are implicative of the park-brake system having a fully-set operating state, signal types that are implicative of the park-brake system having a fully-released operating state, signal types implicative of the park-brake system having a not-fully-released operating state, and signal types implicative of the park-brake system having a not-fully-set operating state.

33 Claims, 10 Drawing Sheets

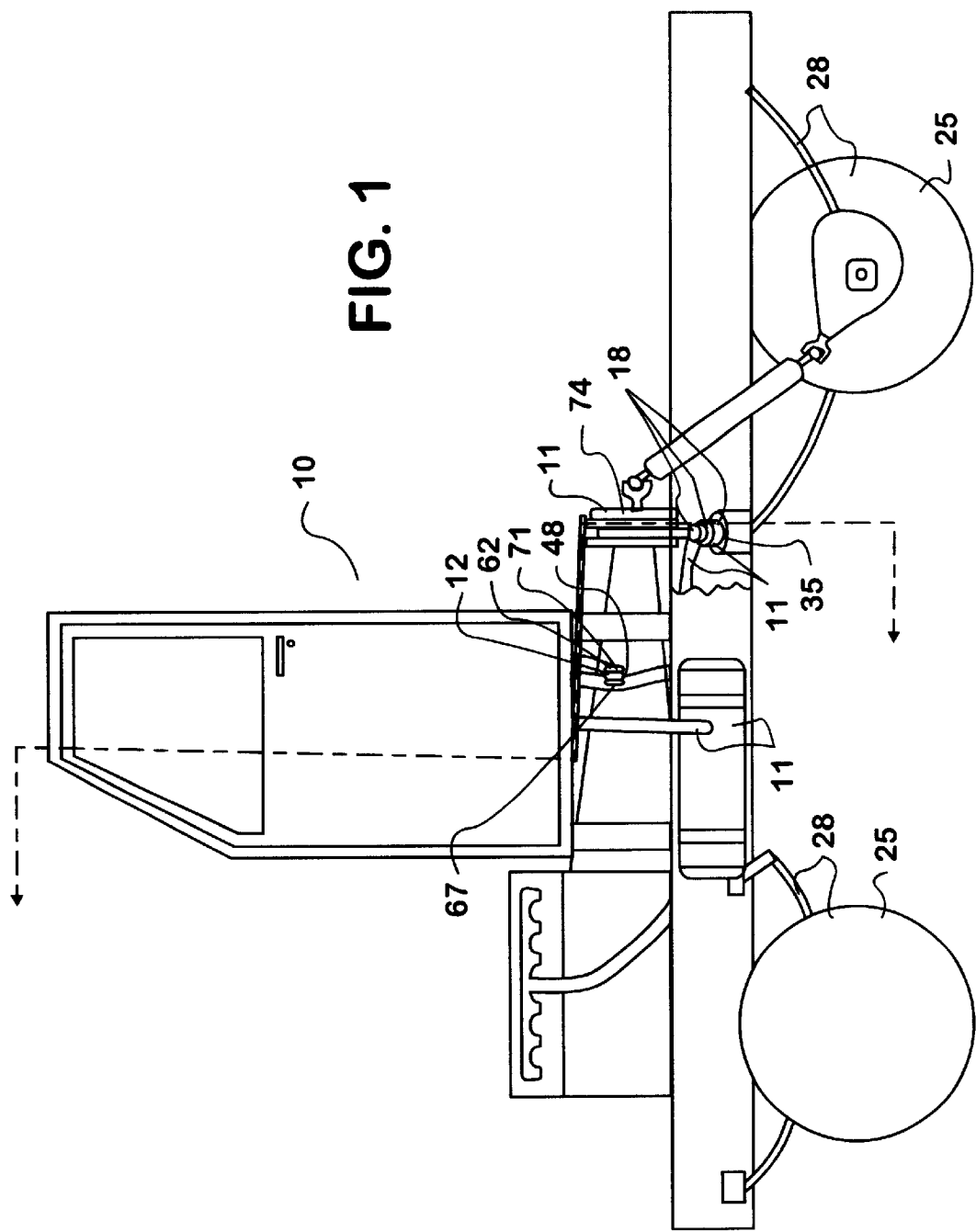

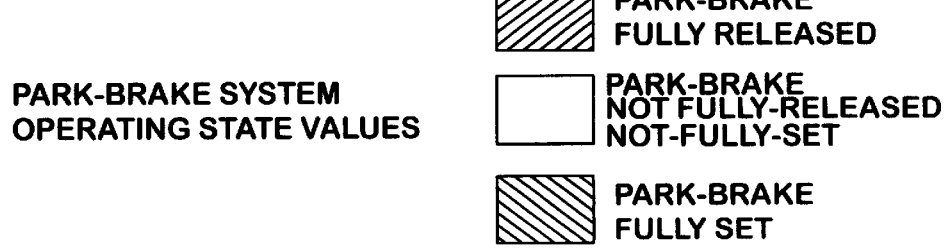
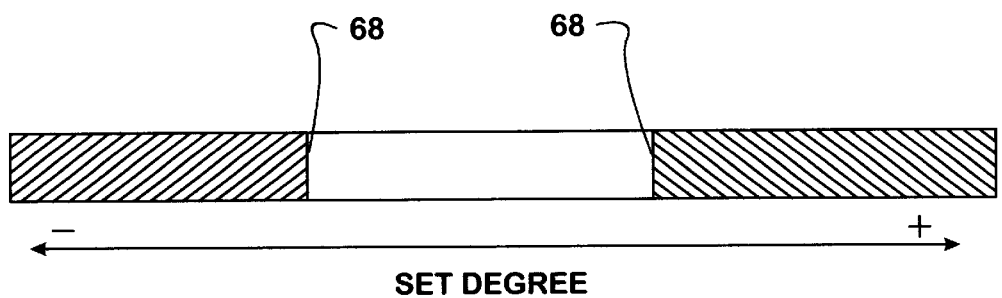
FIG. 4

FIG. 6
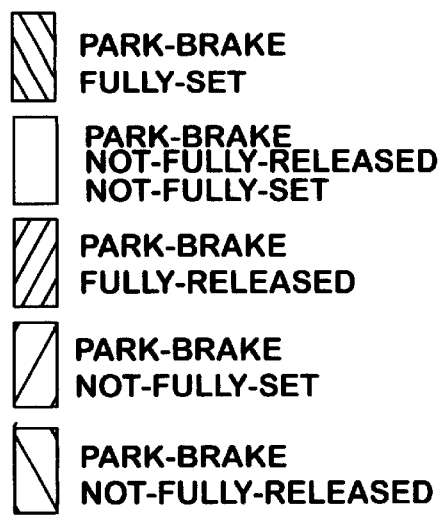
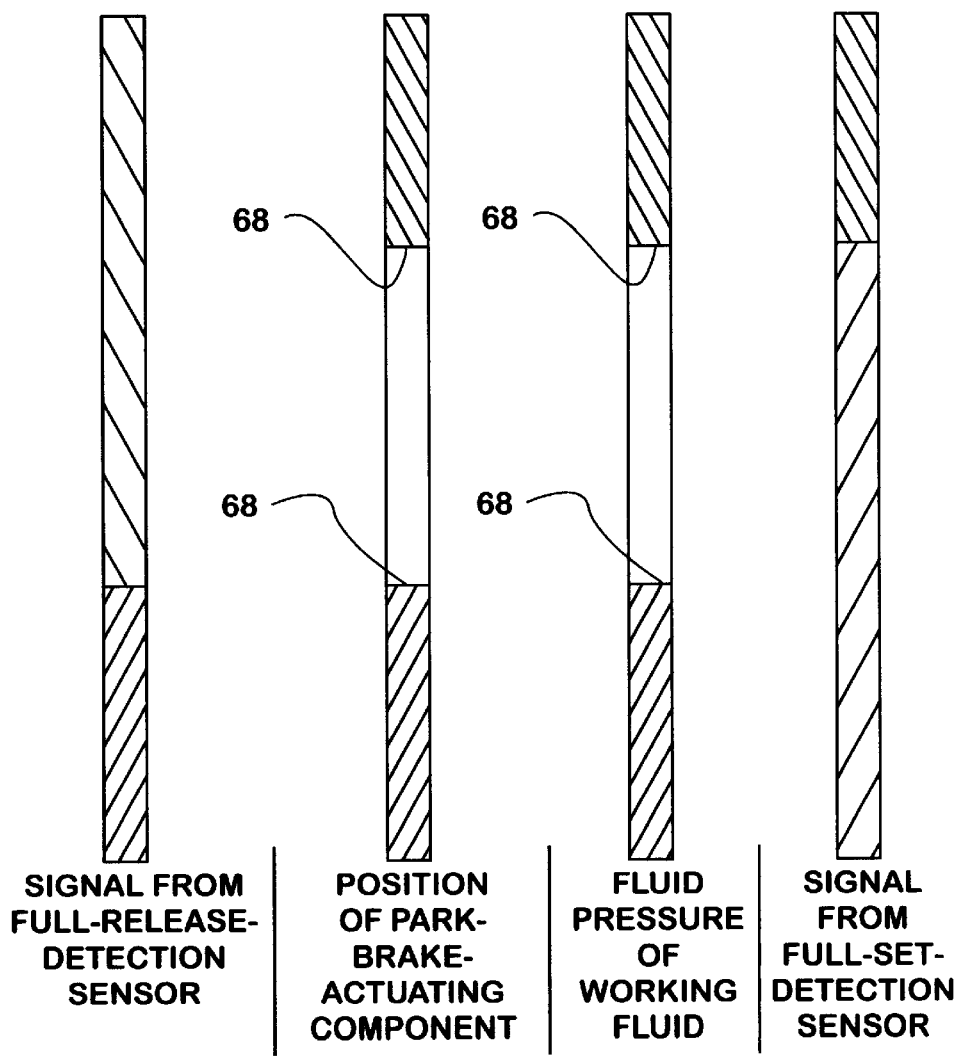

PARK-BRAKE MONITORING-SYSTEM FOR A VEHICLE

BACKGROUND OF THE INVENTION

The present invention relates to park-brake monitoring-systems of vehicles for monitoring the operating state of the park-brake system of the vehicle and/or monitoring the park-brake system of the vehicle for potential malfunctions.

DRAWINGS

Other objects and advantages of the invention will become more apparent upon perusal of the detailed description thereof and upon inspection of the drawings in which:

FIG. 1 is a side elevation view of a vehicle that includes an embodiment of a park-brake monitoring-system according to the present invention.

FIG. 4 is a graphical representation of at least a portion of the continuum of values that the operating state of a park-brake system may have.

FIG. 6 is a graphical representation of the relationships between different set-degree-dependent parameters of one embodiment of a park-brake system in accordance with the present invention and sensed operating-state signals produced and communicated in manners dependent upon those set-degree-dependent parameters by operating-state sensors of one embodiment of a park-brake monitoring-system in accordance with the present invention.

Figure 7:
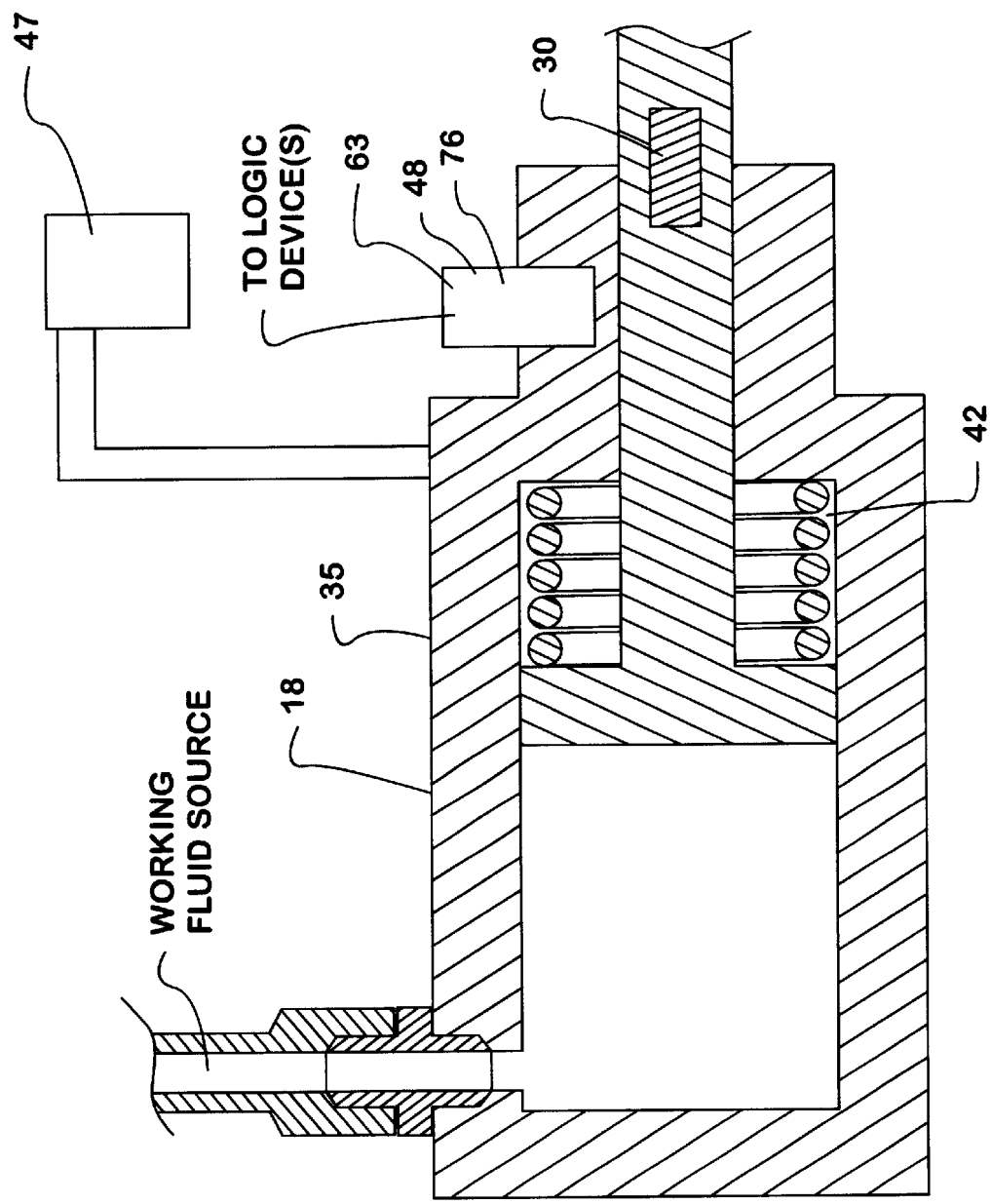

FIG. 7 is a view, mostly in section, of one embodiment of a powered actuator.

Figure 8:
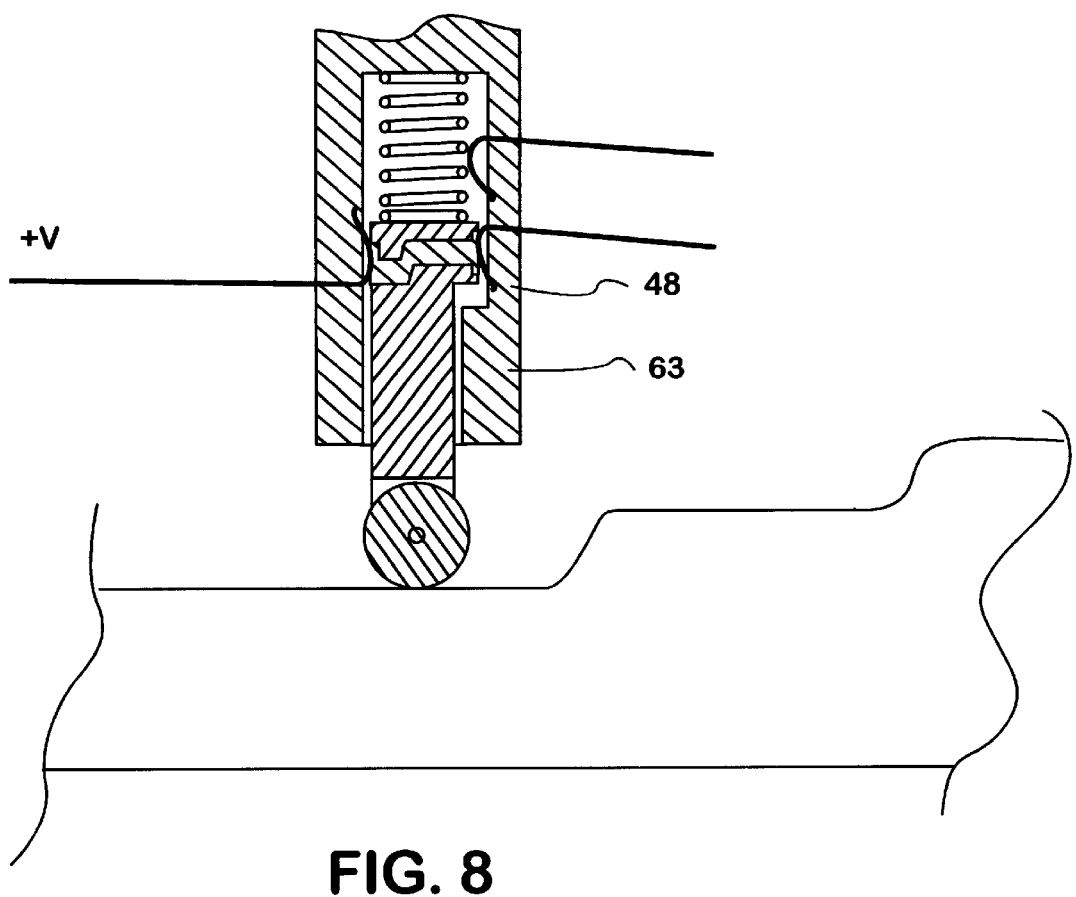

FIG. 8 is a view, mostly in section, showing a position sensor that is of a construction that makes the position sensor well adapted to function as both the full-release-detection sensor and the full-set-detection sensor of a complimentary pair thereof.

Figure 9:
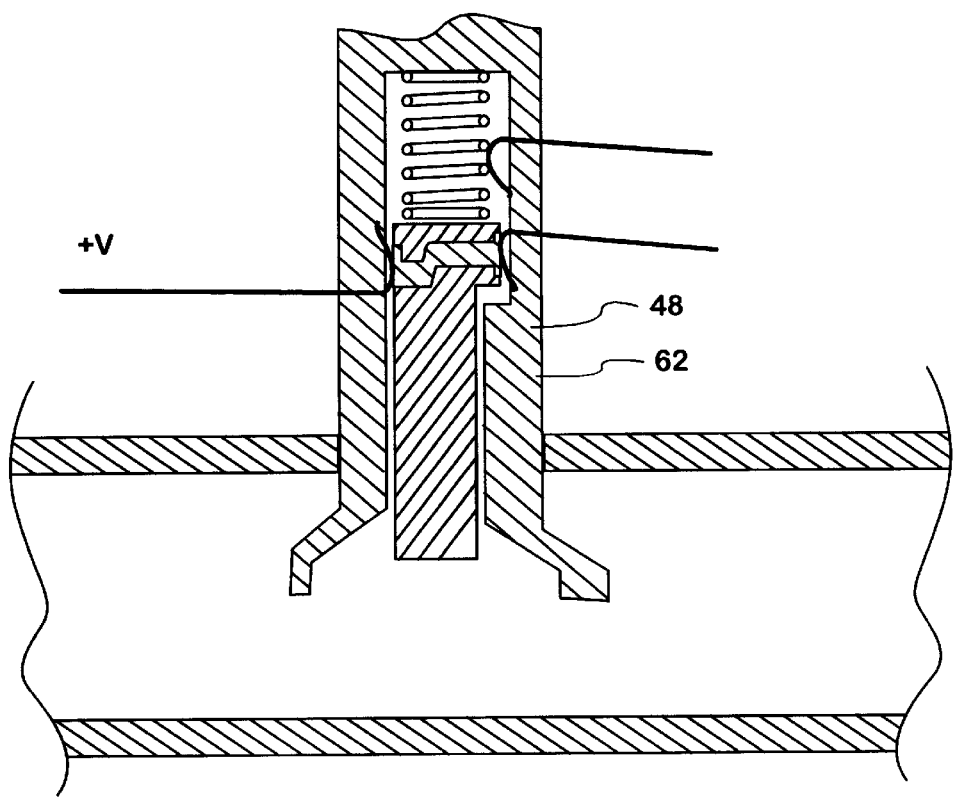

FIG. 9 is a view, mostly in section, showing a pressure sensor that is of a construction that makes the pressure sensor well adapted to function as both the full-release-detection sensor and the full-set-detection sensor of a complimentary pair thereof.

DETAILS OF INVENTION

The present invention is a park-brake monitoring-system 12 for monitoring the operating state of a park-brake system 11 of a vehicle 10 and/or monitoring the park-brake system 11 of the vehicle 10 and the park-brake monitoring-system 12 itself for malfunctions. FIGS. 1, 2a, 2b, 3, 4, 5, 6, 7, 8, and 9 include illustrations of a vehicle 10 with a park-brake system 11 and a park-brake monitoring-system 12 in accordance with the present invention, illustrations of subcomponents and subsystems of the park-brake monitoring-system 12 and the park-brake system 11, a graphical representation of a continuum of values of operating states that a park-brake system 11 in accordance with the present invention may have, a flow chart that outlines an algorithm according to which one embodiment of the present invention operates, and a graphical representation of the relationships between various parameters of the park-brake system 11 and the signal produced by operating-state sensors 48 of one embodiment of the present invention. A vehicle 10 according to the present invention includes one or more frame structure(s) 26 to which a majority of other components of the vehicle 10 are engaged directly or indirectly and which serve to locate the other components of the vehicle 10 relative to one another. A vehicle 10 according to the present invention further comprises one or more body structures 27 that are engaged to and supported by the frame structure(s) 26 of the vehicle 10. The one or more body structure(s) 27 are constructed in such a manner that they are well adapted to enable occupants and/or cargo to reside within or upon them. Additionally, a vehicle 10 according to the present invention includes a suspension system 28 to which the one or more frame structure(s) 26 of the vehicle 10 are engaged, and from which, the one or more frame structure(s) 26 derive support. The suspension system 28 of a vehicle 10 according to the present invention includes one or more ground-engaging component(s) 25. As mentioned above, a vehicle 10 according to the present invention includes a park-brake system 11. The function of the park-brake system 11 is to selectively allow or prevent movement of the vehicle 10 along the ground dependent upon the operating state of the park-brake system 11. One or more of the ground-engaging components 25 of a vehicle 10 according to the present invention are engaged to the frame structure(s) 26 thereof in such a manner that, when the park-brake system 11 has a fully-released operating state, those ground-engaging component(s) 25 can rotate relative to the frame structure(s) 26 and the ground, thus, providing for easy movement of the vehicle 10 over the ground as the ground-engaging component(s) 25 roll over the ground. The park-brake system 11 is constructed and engaged to the vehicle 10 in such a manner that, when the park-brake system 11 has a fully-set operating state, the park-brake system 11 is engaged between one or more of the ground-engaging component(s) 25 and the frame structure(s) 26 of the vehicle 10 in such a manner to prevent relative rotation therebetween and to, thus, prevent movement of the vehicle 10 along the ground. Thus, when an operator of the vehicle 10 wishes to drive the vehicle 10, they effect a fully-released operating state of the park-brake system 11 to allow movement of the vehicle 10 along the ground and, when the operator of the vehicle 10 wishes to leave the vehicle 10 unattended, they can effect a fully-set operating state of the park-brake system 11 to prevent inadvertent, undesirable movement of the vehicle 10 along the ground.

A vehicle 10 and a park-brake system 11 thereof in accordance with the present invention may be constructed and engaged to one another in any of a number of ways that are well-known to and/or easily imaginable by one of ordinary skill in the art and that would effect functionality of the park-brake system 11 and the vehicle 10 as described above. A park-brake system 11 according to the present invention comprises braking components 31 that are mounted directly or indirectly to the frame structure(s) 26 of the vehicle 10 or the ground-engaging component(s) 25 of the vehicle 10. A park-brake system 11 according to the present invention further comprises one or more braked components 74 each of which is engaged directly or indirectly to whichever of the frame structure(s) 26 and the ground-engaging components 25 a complimentary one of the braking components 31 is not mounted to. The braking components 31 and braked components 74 that a park-brake system 11 comprises may be one and the same as braking components of a service-brake system of the vehicle 10 or they may alternatively be separate and distinct from the service-brake system of the vehicle 10. The service-brake system of a vehicle being the first-choice braking-system for slowing a vehicle 10 in motion and the park-brake system 11 of a vehicle being intended for use in preventing movement of a stationary vehicle and to slow a vehicle in motion only when the service-brake system has failed. When a park-brake system 11 according to the present invention has a fully-set operating state, the braking components 31 thereof are engaged to the braked components 74 of the park-brake system 11 with sufficient force to prevent relative rotation between the frame structure(s) 26 and the ground-engaging component(s) 25 of the vehicle 10. When a park-brake system 11 according to the present invention has a fully-released operating state, the braking components 31 thereof are disengaged from the braked components 74, thus, allowing rotation of the ground-engaging component(s) 25 relative to the frame structure(s) 26 and movement of the vehicle 10 along the ground. When the braking components 31 of a park-brake system 11 according to the present invention are engaged to the braked components 74, but the force with which they are engaged to the braked components 74 is insufficient to preclude rotation of the ground-engaging component(s) 25 relative to the frame structure(s) 26 in all normal circumstances that the vehicle may be exposed to, the park-brake system 11 has a park-brake not-fully-released/not-fully-set operating state.

In order to effect a transition of the operating state of the park-brake system 11 between a full-released and a fully-set operating state, the braking components 31 must be moved between positions in which they are disengaged from the braked components 74 and positions in which they are engaged to the braked components 74 with sufficient force to prevent relative rotation therebetween, and thus movement of the vehicle 10 along the ground. Park-brake systems 11 according to the present invention include one or more park-brake-actuating component(s) 18 that are engaged to the braking components 31 in such a manner that the park-brake-actuating component(s) 18 can be actuated in order to move the braking components 31 of the park-brake system 11 from the position(s) they occupy when the park-brake system 11 has a fully-released operating state to the positions they occupy when the park-brake system 11 has a fully-set operating state. The park-brake-actuating component(s) 18 can further be retracted to allow or effect movement of the braking component(s) 31 of the park-brake system 11 from the position(s) they occupy when the park-brake system 11 has a fully-set operating state to the position(s) they occupy when the park-brake system 11 has a fully-released operating state.

A park-brake system 11 according to the present invention further includes park-brake-system controls 19 that are useable by an operator of the vehicle 10 to control actuation and retraction of the park-brake-actuating components 18 and, thus, the operating state of the park-brake system 11. Some or all of the park-brake-system controls 19 of a park-brake-system 11 according to the present invention may be, in fact, park-brake-actuating components 18 of the park-brake system 18. The park-brake-system controls 19 of the present invention include an operator interface 32 that can be manipulated by an operator of the park-brake system 11 to effect the selected operating state of the park-brake system 11 and, thus, when the park-brake system 11 is functioning normally, the actual operating state of the park-brake system 11. It should be understood that any reference to an operator of the park-brake system 11 within this disclosure is intended to be a reference not only to the traditional type of operator of a park-brake system 11, which traditional type of operator is an individual, but also more contemporary types of operators of park-brake systems 11 such as automatic control systems of the vehicle 10. The selected operating state of the park-brake system 11 is defined to be the operating state of the operator interface 32 of the park-brake system 11. The selected operating state of the park-brake system 11 is considered to be set when the operator interface 32 has any of its operating states that cause the actual operating state of the park-brake system 11 to be fully-set when the park-brake system 11 is functioning normally. The selected operating state of the park-brake system 11 is considered to be released when the operator interface 32 has any of its operating states that cause the actual operating state of the park-brake system 11 to be fully-released when the park-brake system 11 is functioning normally. It will also be understood that part or all of a park-brake monitoring-system 12 according to the present invention may be part of the park-brake-system controls 19 of the park-brake system 11 that it monitors.

A park-brake monitoring-system 12 according to the present invention may monitor a park-brake system 11 that has manually-actuated park-brake-actuating component(s) 18 or a park-brake system 11 that has power-actuated park-brake-actuating component(s) 18. Manually-actuated park-brake-actuating component(s) 18 of a park-brake system 11 may have any construction and interaction with one another that allows an operator of the vehicle 10 to actuate and or retract them by applying forces and/or moments to one or more of the park-brake-actuating components 18 through which those forces and/or moments are transferred in a direct or converted manner to other park-brake-actuating components 18 to effect their actuation and/or retraction. Power-actuated park-brake-actuating component(s) 18 comprise a powered actuator 35 that utilizes stored mechanical and/or electrical energy from an energy storage device on the vehicle 10 to actuate and/or retract the other park-brake-actuating component(s) 18 of the park-brake system 11. A powered actuator 35 according to the present invention may comprise energy conversion, transfer and storage device(s) including but not limited to rotary electric motors, linear electric motors, fluid-actuated piston-in-cylinder devices, devices that include fluid-actuated diaphragms, fluid-actuated rotary motors, and springs.

As is graphically represented in FIG. 4, for purposes of this disclosure the operating state of the park-brake system 11 is considered to have a multitude of values each of which is part of a continuum. At least part of the continuum of values of the operating state of a park-brake system 11 is constituted by value of the types set forth above, those types of values being park-brake fully-released, park-brake not-fully-released/not-fully-set, and park-brake fully-set. As can be seen in FIG. 4, on the continuum of values of operating states of a park-brake system 11 according to the present invention, the values of the operating state of the park-brake not-fully-released/not-fully-set type are disposed adjacent to each of and between the values of the park-brake fully-released type and the values of the park-brake fully-set type. As can also be seen in FIG. 4, for purpose of this disclosure, the values of the operating state of the present invention that separate the values of the park-brake not-fully-released/not-fully-set type from the values of the park-brake fullyreleased type and the values of the park-brake fully-set type respectively are considered to be boundary values of the operating state of the park-brake system 11. Additionally, for purposes of this disclosure, it is considered that the operating state of a park-brake system 11 is set to some degree when it has any of the different values of its continuum of values. When the park-brake system 11 has an operating state the value of which is of the park-brake fully-set type it is considered to have an operating state that is set to a greater degree than when the park-brake system 11 has an operating state the value of which is of the park-brake not-fully-released/not-fully-set type. When the park-brake system 11 has an operating state the value of which is of the park-brake not-fully-released/not-fully-set type it is considered to have an operating state that is set to a greater degree than when the park-brake system 11 has an operating state the value of which is of the park-brake fully-released type. Additionally, when a park-brake system 11 has any given value of its operating state that is a value of one of the types listed above, the park-brake system 11 is considered to have an operating state that is set to a greater and lesser degree than when the park-brake system 11 has others of its values of its operating state that are of the same type. For example, when the operating state of a park-brake system 11 has a particular value that is of the park-brake fully-released type, the operating state of the park-brake system 11 is set to a greater degree than it is when the operating state of the park-brake system 11 has some values, different from the particular value, that are of the park-brake fully-released type and, at the same time, the operating state of the park-brake system 11 is set to a lesser degree than it is when the operating state has other values, different from the particular value, that are of the park-brake fully-released type. When a park-brake system 11 has a given value of its operating state that is of the park-brake fully-released type it is considered that the park-brake system 11 has an operating state that is set to a greater degree than when it has other values of its operating state that are of the park-brake fully-released type and that are farther than the particular value, on the continuum of values of its operating state, from the park-brake not-fully-released/not-fully-set values. In a corollary manner, when a park-brake system 11 has a given value of its operating state that is of the park-brake fully-released type it is considered that the park-brake system 11 has an operating state that is set to a lesser degree than when it has other values of its operating state that are of the park-brake fully-released type and that are closer than the particular value, on the continuum of values of its operating state, to the park-brake not-fully-released/not-fully-set values. Likewise, when the operating state of a park-brake system 11 has a particular value that is of the park-brake not-fully-released/not-fully-set type, the operating state of the park-brake system 11 is set to a greater degree than it is when the operating state of the park-brake system 11 has some values, different from the particular value, that are of the park-brake not-fully-released/not-fully-set type and, at the same time, the operating state of the park-brake system 11 is set to a lesser degree than it is when the operating state has other values, different from the particular value, that are of the park-brake not-fully-released/not-fully-set type. When a park-brake system 11 has a given value of its operating state that is of the park-brake not-fully-released/not-fully-set type it is considered that the park-brake system 11 has an operating state that is set to a greater degree than when it has other values of its operating state that are of the park-brake not-fully-released/not-fully-set type and that are closer than the particular value, on the continuum of values of its operating state, to the park-brake fully-released values, In a corollary manner, when a park-brake system 11 has a given value of its operating state that is of the park-brake not-fully-released/not-fully-set type it is considered that the park-brake system 11 has an operating state that is set to a lesser degree than when it has other values of its operating state that are of the park-brake not-fully-released/not-fully-set type and that are closer than the particular value, on the continuum of values of its operating state, to the park-brake fully-set values. Likewise, when the operating state of a park-brake system 11 has a particular value that is of the park-brake fully-set type, the operating state of the park-brake system 11 is set to a greater degree than it is when the operating state of the park-brake system 11 has some values, different from the particular value, that are of the park-brake fully-set type and, at the same time, the operating state of the park-brake system 11 is set to a lesser degree than it is when the operating state has other values, different from the particular value, that are of the park-brake fully-set type. When a park-brake system 11 has a given value of its operating state that is of the park-brake fully-set type it is considered that the park-brake system 11 has an operating state that is set to a greater degree than when it has other values of its operating state that are of the park-brake fully-set type and that are closer than the particular value, on the continuum of values of its operating state, to the park-brake not-fully-released/not-fully-set values. In a corollary manner, when a park-brake system 11 has a given value of its operating state that is of the park-brake fully-set type it is considered that the park-brake system 11 has an operating state that is set to a lesser degree than when it has other values of its operating state that are of the park-brake fully-set type and that are farther than the particular value, on the continuum of values of its operating state, from the park-brake not-fully-released/not-fully-set values. As is discussed in greater detail elsewhere in this specification the values of the operating state of a park-brake system 11 are correlated with one or more other parameters of the park-brake system 11. For purposes of this disclosure those parameters that are correlated to the values of the operating state of the park-brake system 11 will be considered to be set-degree-dependent parameters. The set-degree-dependent parameters that values of the operating state of the park-brake system 11 of the park-brake fully-released type are most closely correlated to are the positions of the braking components 31 and the park-brake-actuating components 18 of the park-brake system 11. As was mentioned above, when the braking components 31 and the park-brake-actuating components 18 are in positions such that the braking components 31 are disengaged from the braked components 74, the value of the operating state of the park-brake system 11 is of the park-brake fully-released type. The closer the position of the braking components 31 is to a position in which they are engaged to the braked components 74 the greater is the degree to which the operating state of the park-brake system 11 is set. The set-degree-dependent parameter that values of the operating state of the park-brake system 11 of the park-brake not-fully-released/not-fully-set type and also values of the park-brake fully-set type are most closely correlated to is the magnitude of the force with which the braking components 31 are engaged to the braked components 74. As was mentioned above, when the braking components 31 are engaged to the braked components 74 with sufficient force to preclude relative rotation therebetween in all circumstances that the vehicle 10 may normally be subjected to, the value of the operating state of the park-brake system 11 is of the park-brake fully-set type. As was also mentioned above, when the braking components 31 are engaged to the braked components 74 with insufficient force to preclude relative rotation therebetween in all circumstances which the vehicle 10 may normally be subjected to, the value of the operating state of the park-brake system 11 is of the park-brake not-fully-released/not-fully-set type. Thus, the greater is the force with which the braking components 31 are engaged to the braked components 74 the greater is the degree to which the operating state of the park-brake system 11 is set for both circumstances in which the operating state of the park-brake system 11 has a park-brake not-fully-released/not-fully-set value and circumstances in which the operating state of the park-brake system 11 has a park-brake fully-set value. A properly functioning park-brake system 11 only has a park-brake not-fully-released/not-fully-set operating state during transitioning of the park-brake system 11 between a park-brake fully-released operating state and a park-brake fully-set operating state. Existence of a park-brake not-fully-released/not-fully-set operating state of a park-brake system 11 during times other than transitioning of the operating state of the park-brake system 11 between a park-brake fully-set and a park-brake fully-released operating state generally serves no useful purpose. If a vehicle 10 is left unattended with the park-brake system 11 having a park-brake not-fully-released/not-fully-set operating state, the vehicle 10 could undesirably and inadvertently move. Additionally, if a vehicle 10 is driven with the park-brake system 11 having a park-brake not-fully-released/not-fully-set operating state, sliding contact between the braking components 31 and braked components 74 causes generation of heat in the braking-components 31 and the braked components 74 and the heat that is generated, if it is great enough, can cause damage to the braking components 31, the braked components 74, and/or other components of the vehicle 10.

The park-brake monitoring-system 12 of the present invention includes one or more operating-state sensors 48. Each of the operating-state sensors 48 of a park-brake monitoring-system 12 in accordance with the present invention senses the value of one or more set-degree-dependent parameters of the park-brake system 11 that is monitored by the park-brake monitoring-system 12. Each of the operating-state sensors 48 of a park-brake monitoring-system 12 according to the invention further produces and communicates sensed operating-state signals to other components of the vehicle 10 in a manner that is dependent upon the value of the set-degree-dependent parameter(s) the value of which the operating-state sensor 48 senses. As was mentioned above, the positions of each of the park-brake-actuating components 18 of a park-brake system 11 are set-degree-dependent parameters of the park-brake system 11. Other parameters of various types of park-brake systems 11 that are set-degree-dependent parameters thereof include, but are not limited to, engagement forces between components of the park-brake system 11, positions of the braking components 31, voltages within various electrical circuits of the park-brake system 11, and pressures of working fluids of the park-brake system 11. By sensing the values of set-degree-dependent parameters of a park-brake system 11 and producing and communicating sensed operating-state signals to the other components of the vehicle 10 in a manner that is dependent upon the values of the set-degree-dependent parameters that they sense, the operating-state sensors 48 of a park-brake monitoring-system 12 enable operation of other systems and components of the vehicle 10 in manners that are tailored to the value of the operating state of the park-brake system 11. For instance, in some embodiments and usages of the present invention the production and communication of such sensed operating-state signals to other components of the vehicle 10 may enable communication of the value of the operating state and/or indications of malfunction conditions of the park-brake system 11 to an operator of the vehicle 10 through one or more indicators and, thus, enable the operator of the vehicle 10 to control the vehicle 10 in a manner that is appropriate for the value that the operating state of the park-brake system 11 has and/or the existence or lack thereof of a malfunction of the park-brake system 11. In some embodiments and usages of the present invention such sensed operating-state signals are produced and communicated to automatic control systems of the vehicle 10, such as an automatic control system for a power transmission of the vehicle 10, so that those automatic control systems may automatically control systems of the vehicle 10 in manners appropriate for the existing value of the operating state of the park-brake system 11 and/or the existence or lack thereof of a malfunction of the park-brake system 11. In some embodiments and usages of the present invention sensed operating-state signals may be produced and communicated to components of the vehicle 10 that store data that is related to those sensed operating-state signals and which data can be retrieved at a later time for purposes such as performing maintenance checks on the vehicle 10 and for any other purpose for which it would be useful to have information related to the value that the operating state of the park-brake system 11 has had and/or whether or not, and in some cases in what manner, the park-brake system 11 has malfunctioned. It is contemplated that a person of ordinary skill in the art to which the present invention relates could easily determine numerous different parameters that are set-degree-dependent parameters, including those mentioned above as well as others not mentioned above, of well-known and future park-brake systems 11 the values of which the operating-state sensors 48 could sense in order to produce and communicate sensed-operating state signals to other components of the vehicle 10 for the purposes discussed above.

The values that a set-degree-dependent parameter of a park-brake system 11 according to the present invention may have can be categorized in any of a number of different ways. Some categories of values of set-degree-dependent parameters of park-brake systems 11 that relate to the configuration and operation of a park-brake monitoring-system 12 in accordance with the present invention include park-brake fully-released values, park-brake fully-set values, park-brake not-fully-set values, park-brake not-fully-released values, and park-brake not-fully-released/not-fully-set values. Each of these categories of values of set-degree-dependent parameters of a park-brake system 11 includes values thereof that the set-degree-dependent parameters have when the operating state of the park-brake system 11 has particular ones of the above-described types of its values. Park-brake fully-set values of a set-degree-dependent parameter of a park-brake system 11 are values that the set-degree-dependent parameter has when the park-brake system 11 has values of its operating state that are of the park-brake fully-set type. Park-brake fully-released values of a set-degree-dependent parameter of a park-brake system 11 are values that the set-degree-dependent parameter has when the park-brake system 11 has values of its operating state that are of the park-brake fully-released type. Park-brake not-fully-released/not-fully-set values of a set-degree-dependent parameter of a park-brake system 11 are values that the set-degree-dependent parameter has when the park-brake system 11 has values of its operating state that are of the park-brake not-fully-released/not-fully-set type. Park-brake not-fully-released values of a set-degree-dependent parameter of a park-brake system 11 are values that the set-degree-dependent parameter has when the park-brake system 11 has values of its operating state that are of the park-brake fully-set type or the park-brake not-fully-released/not-fully-set type. Park-brake not-fully-set values of a set-degree-dependent parameter of a park-brake system 11 are values that the set-degree-dependent parameter has when the park-brake system 11 has values of its operating state that are of the park-brake fully-released type or the park-brake not-fully-released/not-fully-set type. Boundary values of a set-degree-dependent parameter of a park-brake system 11 are values that the set-degree-dependent parameter has when the park-brake system 11 has boundary values of its operating state. Thus, boundary values of set-degree-dependent parameters of a park-brake system are values of the set-degree-dependent parameter that either separate the park-brake fully-set values and the park-brake not-fully-released/not-fully-set values of the set-degree-dependent parameter or separate the park-bake fully-released values and the park-brake not-fully-released/not-fully-set values of the set-degree-dependent parameter. Of course some set-degree-dependent parameters may be such that some or all of the values within one or more of the categories of values described above may be indiscernible from some or all of the values of other ones of the categories of values described above. For instance, in some cases a set-degree-dependent parameter may be such that its park-brake fully-released values are not discernible from its park-brake not-fully-released/not-fully-set values.

A park-brake monitoring-system 12 in accordance with the present invention is configured in such a manner that, when the park-brake system 11 and the park-brake monitoring-system 12 are functioning properly, the operating-state sensors 48 thereof produce and communicate sensed operating-state signals that are useable to discern whether the value of the operating state of the park-brake system 11 is most likely of the park-brake fully-released type, is most likely of the park-brake fully-set type, or is most likely of the park-brake not-fully-released/not-fully-set type. In order to ensure such operation the operating-state sensors 48 of a park-brake monitoring-system 12 according to the present invention include at least one complimentary pair of a full-release-detection sensor 65 and a full-set-detection sensor 71. Each full-set-detection sensor 71 of a park-brake monitoring-system 12 according to the present invention is configured and interacted with the park-brake system 11 monitored thereby in such a manner that, when the set-degree-dependent parameter the value of which the full-set-detection sensor 71 senses has at least certain ones of its park-brake fully-set values, the full-set-detection sensor 71 produces and communicates a park-brake fully-set signal to other components of the vehicle 10. Each full-release-detection sensor 65 of a park-brake monitoring-system 12 according to the present invention is configured and interacted with the park-brake system 11 monitored thereby in such a manner that, when the set-degree-dependent parameter the value of which the full-release-detection sensor 65 senses has at least certain ones of its park-brake fully-released values, the full-release-detection sensor 65 produces and communicates a park-brake fully-released signal to other components of the vehicle 10. Each complimentary pair of a full-release-detection sensor 65 and a full-set-detection sensor 71 is further configured and interacted with the park-brake system 11 in such a manner that there exist circumstances of normal, non-malfunctioning operation of the park-brake system 11 and the park-brake monitoring-system 12 during which the set-degree-dependent parameter(s) sensed by the full-release-detection sensor 65 and the full-set-detection sensor 71 have park-brake not-fully-released/not-fully-set values, and during which the full-set-detection sensor 71 is not producing a park-brake fully-set signal and the full-release-detection sensor 65 is not producing a park-brake fully-released signal. Of course, in order for a complimentary pair of a full-release-detection sensor 65 and a full-set-detection sensor 71 to function as described above the full-release-detection sensor 65 must sense the value of a set-degree-dependent parameter that has at least some park-brake fully-released values that are discernible from at least some of its park-brake not-fully-released/not-fully-set values and the full-set-detection sensor 71 must sense the value of a set-degree-dependent parameter that has at least some park-brake fully-set values that are discernible from at least some of its park-brake not-fully-released/not-fully-set values.

Each one of the full-release-detection sensors 65 of a park-brake monitoring-system 12 according to the present invention may or may not produce and communicate a park-brake fully-released signal to other components of the vehicle 10 any time the set-degree-dependent parameter the value of which the full-release-detection sensor 65 senses has any of its park-brake fully-released values. In some embodiments of the present invention one or more of the full-release-detection sensors 65 is constructed and interacted with the park-brake system 11 in such a manner that it produces and communicates a park-brake fully-released signal to other components of the vehicle 10 any time the set-degree-dependent parameter the value of which it senses has any of its park-brake fully-released values. Full-release-detection sensors 65 that function in such a manner advantageously do a very thorough job of enabling tailoring of the operation of other components of the vehicle 10 to be appropriate to whether or not the park-brake system 11 has a fully-released operating state. In some embodiments of the present invention one or more of the full-release-detection sensors 65 is constructed and interacted with the park-brake system 11 in such a manner that it produces and communicates a park-brake fully-released signal to other components of the vehicle 10 only when the set-degree-dependent parameter the value of which it senses has certain ones of its park-brake fully-released values. In some cases a park-brake monitoring-system 12 constructed in such a manner that a full-release-detection sensor 65 functions in such a manner is often more cost effective, space efficient, and/or more reliable than a similar park-brake monitoring-system 12 that is constructed with a full-release-detection sensor 65 that is constructed and interacted with the park-brake system 11 in such a manner that it produces and communicates a park-brake fully-released signal to other components of the vehicle 10 any time the set-degree-dependent parameter the value of which it senses has any one of its park-brake fully-released values. In some embodiments of the present invention each one of the full-release-detection sensors 65 is constructed and interacted with the park-brake system 11 in such a manner that it only produces and communicates a park-brake fully-released signal when the set-degree-dependent parameter the value of which it senses has certain ones of its park-brake fully-released values.

Each one of the full-set-detection sensors 71 of a park-brake monitoring-system 12 according to the present invention may or may not produce and communicate a park-brake fully-set signal to other components of the vehicle 10 any time the set-degree-dependent parameter the value of which the full-set-detection sensor 71 senses has any of its parkbrake fully-set values. In some embodiments of the present invention one or more of the full-set-detection sensors 71 is constructed and interacted with the park-brake system 11 in such a manner that it produces and communicates a parkbrake fully-set signal to other components of the vehicle 10 any time the set-degree-dependent parameter the value of which it senses has any of its park-brake fully-set values. Full-set-detection sensors 71 that function in such a manner advantageously do a very thorough job of enabling tailoring of the operation of other components of the vehicle 10 to be appropriate to whether or not the park-brake system 11 has a fully-set operating state. In some embodiments of the present invention one or more of the full-set-detection sensors 71 is constructed and interacted with the park-brake system 11 in such a manner that it produces and communicates a park-brake fully-set signal to other components of the vehicle 10 only when the set-degree-dependent parameter the value of which it senses has certain ones of its park-brake fully-set values. In some cases a park-brake monitoring-system 12 constructed in such a manner that a full-set-detection sensor 71 functions in such a manner is often more cost effective, space efficient, and/or more reliable than a similar park-brake monitoring-system 12 that is constructed with a full-set-detection sensor 71 that is constructed and interacted with the park-brake system 11 in such a manner that it produces and communicates a parkbrake fully-set-signal to other components of the vehicle 10 any time the set-degree-dependent parameter the value of which it senses has any one of its park-brake fully-set values. In some embodiments of the present invention each one of the full-set-detection sensors 71 is constructed and interacted with the park-brake system 11 in such a manner that it only produces and communicates a park-brake fullyset signal when the set-degree-dependent parameter the value of which it senses has certain ones of its park-brake fully-set values. As is described in greater detail below, there are a number of different ways that a person of ordinary skill in the art to which the present invention relates could, without undue experimentation, construct and interact with a park-brake system 11 and a park-brake monitoring-system 12 a complimentary pair of a full-release-detection sensor 65 and a full-set-detection sensor 71 that would effect functioning of the complimentary pair of a full-release-detection sensor 65 and a full-set-detection sensor 71 as described above.

There are a number of different ways that a person of ordinary skill in the art to which the present invention relates could, without undue experimentation, construct and interact with a park-brake monitoring-system 12 and a parkbrake system 11 a complimentary pair of a full-releasedetection sensor 65 and a full-set-detection sensor 71 such that there exist circumstances during normal, nonmalfunctioning operation of the park-brake system 11 and the park-brake monitoring-system 12 when the set-degreedependent parameter(s) the value(s) of which the fullrelease-detection sensor 65 and the full-set-detection sensor 71 of the complimentary pair thereof sense have/has a park-brake not-fully-released/not-fully-set value and the full-set-detection sensor 71 does not produce a park-brake fully-set signal and the full-release-detection sensor 65 does not produce a park-brake fully-released signal. Effecting such a functionality of a complimentary pair of a fullrelease-detection sensor 65 and a full-set-detection sensor 71 is particularly easy in embodiments where the full-setdetection sensor 71 and the full-release-detection sensor 65 sense the value of a same set-degree-dependent parameter of the park-brake system 11. In such an arrangement the full-set-detection sensor 71 and the full-release-detection sensor 65 are simply configured and interacted with the park-brake system 11 such that there exist at least some park-brake not-fully-released/not-fully-set values of the setdegree-dependent parameter, the value of which they sense, that neither cause the full-set-detection sensor 71 to produce a park-brake fully-set signal or cause the full-releasedetection sensor 65 to produce a park-brake fully-released signal. For example, in some embodiments of the present invention a complimentary pair of a full-release-detection sensor 65 and a full-set-detection sensor 71 may both sense the value of a set-degree-dependent parameter that is a fluid pressure of a working fluid of the park-brake system 11. In such an embodiment the fluid pressure of the working fluid may have park-brake-fully released values that include any pressure greater than 40 psi, park-brake fully-set values that include any pressure less than 20 psi, and park-brake notfully-released/not-fully-set values that include pressures between 20 psi and 40 psi. In such an embodiment a complimentary pair of a full-release-detection sensor 65 and a full-set-detection sensor 71 that senses the fluid pressure of the working fluid would be constructed and interacted with the park-brake system 11 in such a manner that the existence of at least one fluid pressure value between 20 psi and 40 psi causes the full-set-detection sensor 71 to not produce a park-brake fully-set signal and also causes the full-releasedetection sensor 65 to not produce a park-brake fullyreleased signal. Additionally in such an embodiment each full-release-detection sensor 65 that senses the fluid pressure of the working fluid would be constructed and interacted with the park-brake system 11 in such a manner that the existence of at least one fluid pressure value greater than 40 psi causes the full-release-detection sensor 65 to produce a park-brake fully-released signal. Likewise, in such an embodiment each full-set-detection sensor 71 that senses the fluid pressure of the working fluid would be constructed and interacted with the park-brake system 11 in such a manner that the existence of at least one fluid pressure value less than 20 psi causes the full-set-detection sensor 65 to produce a park-brake fully-set signal.

In some embodiments of the present invention the fullset-detection sensor 71 and the full-release-detection sensor 65 of a complimentary pair of a full-release-detection sensor 65 and a full-set-detection sensor 71 sense the values of different set-degree-dependent parameters. For instance, in some embodiments of the present invention the full-setdetection sensor 71 senses the fluid pressure of a working fluid of the park-brake system 11 while the full-releasedetection sensor 65 senses the position of a park-brakeactuating component 18 of the park-brake system 11. Such a complimentary pair of a full-release-detection sensor 65 and a full-set-detection sensor 71 that sense values of different set-degree-dependent parameters of a park-brake system 11 can be constructed and interacted with the parkbrake system 11 in such a manner to effect functioning of the complimentary pair of a full-released-detection sensor 65 and a full-set-detection 71 in accordance with the present invention as long as the set-degree-dependent parameters, the values of which the full-set-detection sensor 71 and the full-release-detection sensor 65 sense, are correlated to one another. For example, the fluid pressure of a working fluid of the park-brake system 11 may be (and often is) correlated to the position of a park-brake-actuating component 18 of the park-brake system 11. In other words, for each given fluid pressure of a working fluid of the park-brake system 11 there may be a position or a range of positions that it is known that a given park-brake-actuating component 18 will have when that given fluid pressure of the working fluid exists during normal, non-malfunctioning operation of the park-brake system 11. Thus, a complimentary pair of a full-release-detection sensor 65 and a full-set-detection sensor 71 in accordance with the present invention may be constructed and interacted with the park-brake system 11 in such a manner that the existence of certain park-brake not-fully-released/not-fully-set values of a first set-degree-dependent parameter, the value of which the full-set-detection sensor 71 senses, cause the full-set-detection sensor 71 to not produce a park-brake fully-set signal, and the existence of certain corresponding park-brake not-fully-released/not-fully-set values of a second set-degree-dependent parameter, the value of which the full-release-detection sensor 65 senses, causes the full-release-detection sensor 65 to not produce a park-brake fully-released signal. For instance, a complimentary pair of a full-release-detection sensor 65 and a full-set-detection sensor 71 may have a full-set-detection sensor 71 that senses the value of a fluid pressure of a working fluid of the park-brake system 11 and a full-release-detection sensor 65 that senses the position of a park-brake-actuating component 18 of the park-brake system 11. As was mentioned above the fluid pressure of the working fluid may hypothetically have park-brake fully-released values of 40 psi and greater, park-brake not-fully-released/not-fully-set values of 20–40 psi, and park-brake fully-set values of 20 psi and less. The full-set-detection sensor 71 that senses the value of the working fluid may be constructed and interacted with the park-brake system 11 and the park-brake monitoring-system 12 in such a manner that the existence of certain ones of the park-brake not-fully-released/not-fully-set values, such as 30 psi, of the working fluid causes the full-set-detection sensor 71 to not produce a park-brake fully-set signal. The position of the park-brake-actuating component 18 that is sensed by the full-release-detection sensor 65 may have park-brake fully-released values ranging from a particular reference position to 2 inches displaced from the reference position, park-brake not-fully-released/not-fully-set values that range from 2 inches displaced from its reference position to 4 inches displaced from its reference position, and park-brake fully-set values greater than 4 inches displaced from its reference position. Furthermore, it may be that positions of the park-brake-actuating component 18 of 2.5 inches to 3.5 inches displaced from its reference position correspond to a pressure of 30 psi of the working fluid of the park-brake system 11. In such a situation, constructing the full-set-detection sensor 71 and interacting it with the park-brake system 11 and the park-brake monitoring-system 12 in such a manner that the existence of 30 psi of the working fluid of the park-brake system 11 causes the full-set-detection sensor 71 to not produce a park-brake fully-set signal combined with constructing the full-release-detection sensor 65 and interacting it with the park-brake system 11 and the park-brake monitoring-system 12 in such a manner that the existence of positions of the park-brake-actuating component 18 between 2.5 and 3.5 inches from its reference position causes the full-release-detection sensor 65 to not produce a park-brake fully-released signal would effect functioning of the complimentary pair of the full-set-detection sensor 71 and the full-release-detection sensor 65 in accordance with the present invention. This is so because, during normal operation of such a hypothetical embodiment of the present invention, when the fluid pressure of the working fluid has a park-brake not-fully-released/not-fully-set value of 30 psi, the position of the park-brake-actuating component 18 would have the corresponding park-brake not-fully-released/not-fully-set value of between 2.5 an 3.5 inches from its fully-released position and the full-set-detection sensor 71 would be caused to not produce a park-brake-fully-set signal and the full-release-detection sensor 65 would simultaneously be caused to not produce a produce park-brake fully-released signal. Of course the hypothetical embodiment that is set forth immediately above is just one of numerous ways in which a person of ordinary skill in the art could, without undue experimentation, construct and interact with the park-brake system 11 and the park-brake monitoring-system 12 a complimentary pair of a full-release-detection sensor 65 and a full-set-detection sensor 71 that sense values of different set-degree-dependent parameters such that there exist circumstances that occur during normal, non-malfunctioning operation of the park-brake system 11 and the park-brake monitoring-system 12, when the set-degree-dependent parameters sensed by the full-release-detection sensor 65 and the full-set-detection sensor 71 have park-brake not-fully-released/not-fully-set values, and the full-set-detection sensor 71 is caused to not produce a park-brake fully-set signal and the full-release-detection sensor 65 is caused to not produce a park-brake fully-released signal.

The inclusion, in a park-brake monitoring-system 12 according to the present invention, of one or more complimentary pairs of a full-release-detection sensor 65 and a full-set-detection sensor 71 that sense the values of different set-degree-dependent parameters advantageously provides for excellent detection of malfunctions of the park-brake system 11 and the park-brake monitoring-system 12. This is so in large part due to the fact that a complimentary pair of a full-release-detection sensor 65 and a full-set-detection sensor 71 that senses the values of two different set-degree-dependent parameters of a park-brake system 11 is highly likely to produce and communicate contested sensed-operating state signals to other components of the vehicle 10 when the park-brake system 11 and/or the park-brake monitoring-system 12 malfunction. Contested sensed operating-state signals are sensed operating-state signals that have conflicting implications. In a corollary manner, sensed operating-state signals that do not have conflicting implications are considered to be uncontested sensed operating-state signals. For example, a park-brake fully-released signal produced by a full-release-detection sensor 65 of a complimentary pair of a full-release-detection sensor 65 and a full-set-detection sensor 71 would be contested by a park-brake fully-set signal produced by the full-set-detection sensor 71 because the implication of the park-brake fully-released signal - that the park-brake system 11 has a fully-released operating state conflicts with the implication of the park-brake fully-set signal—that the park-brake system 11 has a fully-set operating state. In a corollary manner, a park-brake fully-set signal produced by a full-set-detection sensor 71 would be contested by a park-brake fully-released signal produced by a full-release-detection sensor 65. A complimentary pair of a full-release-detection sensor 65 and a full-set-detection sensor 71 that senses the values of two different set-degree-dependent parameters is highly likely to produce and communicate contested sensed operating-state signals to other components of the vehicle 10 when the park-brake system 11 and/or the park-brake monitoring-system 12 malfunction because of two common consequences of malfunction of the park-brake system 11 and/or the park-brake monitoring-system 12. One of these common consequences is that, when one of the full-release-detection sensor 65 and the full-set-detection sensor 71 of a complimentary pair thereof malfunctions it is likely to continuously produce and communicate the same signal, which will likely, at some time during normal operation of the park-brake system 11, contest the sensed operating-state signals produced by the other of the full-release-detection sensor 71 and the full-set-detection sensor 71 of the complimentary pair thereof. The other of these two common consequences is that, when the park-brake system 11 malfunctions, many times the correlation between set-degree-dependent parameters of the park-brake system 11 ceases to exist. If, when a park-brake system 11 has malfunctioned, correlation ceases to exist between two different set-degree-dependent parameters, the values of which are sensed by a complimentary pair of a full-release-detection sensor 65 and a full-set-detection sensor 71, it is highly likely that at some point thereafter the values of those two set-degree-dependent parameters will be such that the complimentary pair of full-release-detection sensor 65 and a full-set-detection sensor 71 are caused to produce and communicate contested sensed operating-state signals to other components of the vehicle 10. In some embodiments of the present invention, as will be discussed in greater detail below, a park-brake monitoring-system 12 in accordance with the present invention comprises one or more logic device(s) 15 to which the operating-state sensor(s) 48 produce and communicate sensed operating-state signals. In some of those embodiments of the present invention in which the park-brake monitoring-system 12 comprises one or more logic device(s) 15, the logic device(s) 15 and the logic according to which they operate are configured in a manner such that, when contested sensed operating-state signals are produced and communicated to the logic device (s) 15 by the operating-state sensor(s) 48, the logic device(s) 15 take steps to enable functioning of one or more systems of the vehicle 10 in manners that are appropriate for circumstances in which the park-brake system 11 and/or the park-brake monitoring-system 12 have malfunctioned.

The full-set-detection sensor 71 and the full-release-detection sensor 65 of a complimentary pair of a full-release-detection sensor 65 and a full-set-detection sensor 71 may or may not be separate and distinct components. In many embodiments of the present invention each of the one or more complimentary pairs of a full-release-detection sensor 65 and a full-set-detection sensor 71 comprises a full-release-detection sensor 65 that is a separate distinct component from the full-set-detection sensor 71. Utilizing separate and distinct full-release-detection sensors 65 and full-set-detection sensors 71 has advantages related to providing the park-brake monitoring-system 12 with robust malfunction detecting abilities. In some embodiments of the present invention one or more of the complimentary pairs of a full-release-detection sensor 65 and a full-set-detection sensor 71 comprise a single sensor that actually functions as both the full-release-detection sensor 65 and the full-set-detection sensor 71. Utilization of a sensor that functions as both the full-release-detection sensor 65 and the full-set-detection sensor 71 of a complimentary pair thereof is advantageous in that it facilitates relatively space-efficient construction of the park-brake monitoring-system 12. In order for a single sensor to function as both a full-release-detection sensor 65 and a full-set-detection sensor 71 of a complimentary pair thereof the sensor must be constructed and interacted with the park-brake system 11 and the park-brake monitoring-system 12 in such a manner that the sensor produces and communicates a park-brake fully-released signal to other components of the vehicle 10 when and only when it is appropriate to do so (as is outlined in greater detail elsewhere in this disclosure) and the sensor must further be constructed and interacted with the park-brake system 11 and the park-brake monitoring-system in such a manner that the sensor produces and communicates a park-brake fully-set signal to other components of the vehicle 10 when and only when it is appropriate to do so (as is outlined in greater detail elsewhere in this disclosure). In order for a single sensor to function as a full-release-detection sensor 65 and a full-set-detection sensor 71 of a complimentary pair thereof the single sensor must also be constructed and interacted with the park-brake system 11 in such a manner that the manner in which it produces and communicates park-brake fully-released signals to other components of the vehicle 10 is different from the manner in which it produces and communicates park-brake fully-set signals to other components of the vehicle 10. In order for a single sensor to function as both a full-release-detection sensor 65 and a full-set-detection sensor 71 of a complimentary pair thereof the sensor must further be constructed and interacted with the park-brake system 11 in such a manner that during normal, non-malfunctioning operation of the park-brake system 11 and the park-brake monitoring-system 12, the existence of at least certain ones of park-brake not-fully-released/not-fully-set values of the set-degree-dependent parameter, the value of which the sensor senses, cause the sensor to not produce a park-brake fully-released signal and to not produce a park-brake fully-set signal. FIGS. 8 and 9 illustrate sensors that are constructed in manners such that there are ways in which they could be interacted with a park-brake system 11 and a park-brake monitoring-system 12 in accordance with the present invention in manners such that they would function as both a full-release-detection sensor 65 and a full-set-detection sensor 71 of a complementary pair thereof in accordance with the present invention. It is contemplated that a person of ordinary skill in the art that has read this disclosure could, without any undue experimentation and by using numerous different types of sensors and numerous different manners of interactions of those sensors with the park-brake system 11 and the park-brake monitoring-system 12, engineer many different designs of complimentary pairs of a full-release-detection sensor and a full-set-detection sensor that comprise only a single sensor and that function according to the guidelines set forth by this disclosure.

In addition to producing and communicating park-brake fully-released signals and park-brake fully-set signals in appropriate circumstances as described above, each complimentary pair of a full-release-detection sensor 65 and a full-set-detection sensor 71 produces and communicates park-brake not-fully-released signals, park-brake not-fully-set signals, and/or park-brake not-fully-released/not-fully-set signals in some circumstances of operation of the park-brake monitoring-system 12. Which ones of park-brake not-fully-released signals, park-brake not-fully-set signals, and park-brake not-fully-released/not-fully-set signals a given complimentary pair of a full-release-detection sensor 65 and a full-set-detection sensor 71 produces and communicates to other components of the vehicle 10 is dependent at least in part upon whether the complimentary pair of a full-release-detection sensor 65 and a full-set-detection sensor 71 is constituted by two separate and distinct sensors or a single sensor that functions as both a full-release-detection sensor 65 and a full-set-detection sensor 71. A complimentary pair of a full-release-detection sensor 65 and a full-set-detection sensor 71 that comprises two separate and distinct sensors may produce and communicate any of park-brake not-fully-released signals, park-brake not-fully-set signals, and park-brake not-fully-released/not-fully-set signals to other components of the vehicle 10 in appropriate circumstances. The full-release-detection sensor 65 of such a complimentary pair of a full-release-detection sensor 65 and a full-set-detection sensor 71 produces and communicates either a park-brake not-fully-released signal or a park-brake not-fully-released/not-fully-set signal to other components of the vehicle 10 when the set-degree-dependent parameter the value of which the full-release-detection sensor 65 senses has any park-brake not-fully-released/not-fully-set value. Some full-release-detection sensors 65 that are separate and distinct sensors from the full-set-detection sensor 71 with which they form a complimentary pair, are constructed and interacted with the park-brake system 11 and the park-brake monitoring-system 12 in such a manner that, any and all of the sensed operating-state signals that the full-release-detection sensor 65 produces and communicates during existence of any park-brake not-fully-released/not-fully-set values of the set-degree-dependent parameter that the full-release-detection sensor 65 senses the value of are produced and communicated in a manner that makes them discernible from any and all sensed operating-state signals produced and communicated by the full-release-detection sensor 65 when the set-degree-dependent parameter that the full-release-detection sensor 65 senses the value of has any of its park-brake fully-set values. In such cases, those sensed operating-state signals produced and communicated to other components of the vehicle 10 by such a full-release-detection sensor 65 during the existence of park-brake not-fully-released/not-fully-set values of the set-degree-dependent parameter that the full-release-detection sensor 65 senses the value of are considered to be park-brake not-fully-released/not-fully-set signals. Of course, in order to enable proper operation of a park-brake monitoring-system 12 that comprises such a full-release-detection sensor 65, such a full-release-detection sensor 65 must be configured and interacted with the park-brake system 11 and the park-brake monitoring-system 12 in such a manner that any such park-brake not-fully-released/not-fully-set signal it produces and communicates to other components of the vehicle 10 is produced and communicated in a different manner than any park-brake fully-released signal it produces and communicates to other components of the vehicle 10 so that the park-brake fully-released signals and park-brake not-fully-released/not-fully-set signals are discernible from one another. Some full-release-detection sensors 65 that are separate and distinct sensors from the full-set-detection sensor 71 with which they form a complimentary pair, are constructed and interacted with the park-brake system 11 and the park-brake monitoring-system 12 in such a manner that, some of the sensed operating-state signals that the full-release-detection sensor 65 produces and communicates during existence of some park-brake not-fully-released/not-fully-set values of the set-degree-dependent parameter that the full-release-detection sensor 65 senses the value of are produced and communicated in a manner that makes them indiscernible from some of the sensed operating-state signals produced and communicated by the full-release-detection sensor 65 when the set-degree-dependent parameter that the full-release-detection sensor 65 senses the value of has some of its park-brake fully-set values. In such cases, those sensed operating-state signals produced and communicated to other components of the vehicle 10 by such a full-release-detection sensor 65 during the existence of park-brake not-fully-released/not-fully-set values of the set-degree-dependent parameter that the full-release-detection sensor 65 senses the value of are considered to be park-brake not-fully-released signals. Of course, in order to enable proper operation of a park-brake monitoring-system 12 that comprises such a full-release-detection sensor 65, such a full-release-detection sensor 65 must be configured and interacted with the park-brake system 11 and the park-brake monitoring-system 12 in such a manner that any such park-brake not-fully-released signal it produces and communicates to other components of the vehicle 10 is produced and communicated in a different manner than any park-brake fully-released signal it produces and communicates to other components of the vehicle 10 so that the park-brake fully-released signals and park-brake not-fully-released signals are discernible from one another. A full-set-detection sensor 71 that is a separate and distinct sensor from a full-release-detection sensor 65 with which it forms a complimentary pair produces and communicates either a park-brake not-fully-released signal or a park-brake not-fully-released/not-fully-set signal to other components of the vehicle 10 when the set-degree-dependent parameter the value of which the full-set-detection sensor 71 senses has any park-brake not-fully-released/not-fully-set value. Some full-set-detection sensors 71 that are separate and distinct sensors from the full-release-detection sensor 65 with which they form a complimentary pair, are constructed and interacted with the park-brake system 11 and the park-brake monitoring-system 12 in such a manner that, any and all of the sensed operating-state signals that the full-set-detection sensor 71 produces and communicates during existence of any park-brake not-fully-released/not-fully-set values of the set-degree-dependent parameter that the full-set-detection sensor 71 senses the value of are produced and communicated in a manner that makes them discernible from any and all sensed operating-state signals produced and communicated by the full-set-detection sensor 71 when the set-degree-dependent parameter that the full-set-detection sensor 71 senses the value of has any of its park-brake fully-released values. In such cases, those sensed operating-state signals produced and communicated to other components of the vehicle 10 by such a full-set-detection sensor 71 during the existence of park-brake not-fully-released/not-fully-set values of the set-degree-dependent parameter that the full-set-detection sensor 71 senses the value of are considered to be park-brake not-fully-released/not-fully-set signals. Of course, in order to enable proper operation of a park-brake monitoring-system 12 that comprises such a full-set-detection sensor 71, such a full-set-detection sensor 71 must be configured and interacted with the park-brake system 11 and the park-brake monitoring-system 12 in such a manner that any such park-brake not-fully-released/not-fully-set signal it produces and communicates to other components of the vehicle 10 is produced and communicated in a different manner than any park-brake fully-set signal it produces and communicates to other components of the vehicle 10 so that the park-brake fully-set signals and park-brake not-fully-released/not-fully-set signals are discernible from one another. Some full-set-detection sensors 71 that are separate and distinct sensors from the full-release-detection sensor 65 with which they form a complimentary pair, are constructed and interacted with the park-brake system 11 and the park-brake monitoring-system 12 in such a manner that, some of the sensed operating-state signals that the full-set-detection sensor 71 produces and communicates during existence of some park-brake not-fully-released/not-fully-set values of the set-degree-dependent parameter that the full-set-detection sensor 71 senses the value of are produced and communicated in a manner that makes them indiscernible from some of the sensed operating-state signals produced and communicated by the full-set-detection sensor 71 when the set-degree-dependent parameter that the full-set-detection sensor 71 senses the value of has some of its park-brake fully-released values. In such cases, those sensed operating-state signals produced and communicated to other components of the vehicle 10 by such a full-set-detection sensor 71 during the existence of park-brake not-fully-released/not-fully-set values of the set-degree-dependent parameter that the full-set-detection sensor 71 senses the value of are considered to be park-brake not-fully-set signals. Of course, in order to enable proper operation of a park-brake monitoring-system 12 that comprises such a full-set-detection sensor 71, such a full-set-detection sensor 71 must be configured and interacted with the park-brake system 11 and the park-brake monitoring-system 12 in such a manner that any such park-brake not-fully-set signal it produces and communicates to other components of the vehicle 10 is produced and communicated in a different manner than any park-brake fully-set signal it produces and communicates to other components of the vehicle 10 so that the park-brake fully-set signals and park-brake not-fully-set signals are discernible from one another. A complimentary pair of a full-release-detection sensor 65 and a full-set-detection sensor 71 that comprises only a single sensor that functions as both the full-release-detection sensor 65 and the full-set-detection sensor 71 produces and communicates a park-brake not-fully-released/not-fully-set signal to other components of the vehicle 10 anytime the set-degree-dependent parameter the value of which it senses has a park-brake not-fully-released/not-fully-set value. In fact any signal that the sensor that constitutes such a complimentary pair of a full-release-detection sensor 65 and a full-set-detection sensor 71 produces and communicates to other components of the vehicle 10 when the set-degree-dependent parameter the value of which it senses has a park-brake not-fully-released/not-fully-set value may be considered to be a park-brake not-fully-released/not-fully-set signal produced and communicated to other components of the vehicle 10 by the complimentary pair of a full-release-detection sensor 65 and a full-set-detection sensor 71 constituted by that sensor. Of course, in order for a park-brake monitoring-system 12 that comprises such a complimentary pair of a full-release-detection sensor 65 and a full-set-detection sensor 71 to function properly, any such park-brake not-fully-released/not-fully-set signal produced and communicated to other components of the vehicle 10 must be produced and communicated to other components of the vehicle 10 in a different manner than any park-brake fully-released signals and any park-brake fully-set signals are produced and communicated to other components of the vehicle 10 so that the park-brake not-fully-released/not-fully-set signals are discernible from park-brake fully-released and park-brake fully-set signals.

The sensor(s) that constitute each complimentary pair of a full-release-detection sensor 65 and a full-set-detection sensor 71 of a park-brake monitoring-system 12 in accordance with the present invention may be of any construction and may be interacted with a park-brake system 11 and the park-brake monitoring-system 12 in any manner that causes them to function in accordance with this disclosure. It is contemplated that a person of ordinary skill in the art could, without any undue experimentation, engineer numerous different embodiments of park-brake monitoring-systems 12 in accordance with this disclosure using numerous different types of sensors and manners of interacting those sensors with a park-brake system 11 and the park-brake monitoring-system 12 such that those sensors constitute one or more complimentary pairs of a full-release-detection sensor 65 and a full-set-detection sensor 71 that function in accordance with the teachings this disclosure. The full-set-detection sensor(s) 71 and full-release-detection sensor(s) 65 of a park-brake monitoring-system 12 in accordance with the present invention may comprise devices including, but not limited to, switches, transducers, potentiometers, hall-effect sensors, pressure sensors, and photosensitive device(s). The full-set-detection sensors 71 and full-release-detection sensors 65 may also include or consist of simple conductive components that communicate voltage signals from electrical circuits of the park-brake-system controls 19 to other components of the vehicle 10. The full-set-detection sensors 71 and full-release-detection sensors 65 may also include or consist of simple conductive components that communicate pressure signals from fluid circuits of the park-brake-system controls 19 to other components of the vehicle 10. The full-set-detection sensors 71 and full-release-detection sensors 65 may also include or consist of simple conductive components that communicate light signals from fiber-optic circuits of the park-brake-system controls 19 to other components of the vehicle 10. In some embodiments of the present invention a full-set-detection sensor 71 or a full-release-detection sensor 65 may even comprise one or more logic devices that facilitate the production and communication of signals to other components of the vehicle 10. In fact, in some embodiments of the present invention the park-brake monitoring-system 12 comprises logic device(s) 15, as is described in greater detail below, that control general operation of the park-brake monitoring-system 12. In some of these embodiments one or more full-release-detection sensors 65 and/or one or more full-set-detection sensors 71 may be constituted by the logic device(s) 15 of the park-brake monitoring-system 12 in combination with one or more simple conductive components as described above.

In some embodiments of the present invention one or more of the operating-state sensor(s) 48 may be binary-digital sensors that produce and communicate logic low (binary-digital 0) signals to other components of the vehicle 10 in some circumstances and that produce and communicate logic high (binary-digital 1) signals in other circumstances. In some embodiments of the present invention one or more of the full-set-detection sensor(s) 71 is a binary-digital sensor that is configured and interacted with the park-brake system 11 in such a manner that it produces and communicates either a logic low signal or a logic high signal to other components of the vehicle 10 when the set-degree-dependent parameter, the value of which it senses, has at least certain ones of its park-brake fully-set values. Each such full-set-detection sensor 71 that is a binary-digital sensor that functions as described above is further configured and interacted with the park-brake system 11 in such a manner that, when the set-degree-dependent parameter, the value of which the binary-digital sensor that is the full-set-detection sensor 71 senses, has at least certain ones of its park-brake not-fully-released/not-fully-set values, the binary-digital sensor that is the full-set-detection sensor 71 produces and communicates to other components of the vehicle 10 whichever of a logic low and a logic high signal it does not produce and communicate when that set-degree-dependent parameter has the above-mentioned certain ones of its park-brake fully-set values that cause the production and communication of park-brake fully-set signals. In some embodiments of the present invention one or more of the full-release-detection sensor(s) 65 is a binary-digital sensors that is configured and interacted with the park-brake system 11 in such a manner that it produces and communicates either a logic low signal or a logic high signal to other components of the vehicle 10 when the set-degree-dependent parameter, the value of which it senses, has at least certain ones of its park-brake fully-released values. Each such full-release-detection sensor 65 that is a binary-digital sensor that functions as described above is further configured and interacted with the park-brake system 11 in such a manner that, when the set-degree-dependent parameter, the value of which the binary-digital sensor that is the full-release-detection sensor 65 senses, has at least certain ones of its park-brake not-fully-released/not-fully-set values, the binary-digital sensor that is the full-release-detection sensor 65 produces and communicates to other components of the vehicle 10 whichever of a logic low and a logic high signal it does not produce and communicate when that set-degree-dependent parameter has the above-mentioned certain ones of its park-brake fully-released values that cause the production and communication of park-brake fully-released signals. It is contemplated that a person of ordinary skill in the art to which the present invention relates could, without undue experimentation, engineer numerous different arrangements, including but certainly not limited to those set forth elsewhere in this specification, that include different constructions of binary-digital sensors and different manners of interaction thereof with the park-brake system 11 and the park-brake monitoring-system that would effect functioning of those binary-digital sensors as full-set-detection sensors 71 and/or full-release-detection sensors 65 in the manners described directly above.

In some embodiments of the present invention one or more of the full-release-detection sensors 65 and/or the full-set-detection sensors 71 may produce and communicate sensed operating-state signals that are analog to other components of the vehicle 10. Of course in embodiments of the present invention where one or more of the operating-state sensor(s) 48 produce and communicate analog signals to other components of the vehicle 10, means must be incorporated in the configuration of the vehicle 10 to ensure easy categorization, by one or more users whether those users be individuals or systems of the vehicle 10, of those signals in accordance with the categorization scheme described in this disclosure. The means for such categorization of analog sensed operating-state signals may be logic according to which logic device(s) 15 of the park-brake monitoring-system 12 operate in order to categorize the signals or it may be calibrated categorizing markings of indicators that the park-brake monitoring-system 12 comprises.

In order to ensure understanding of the general principles of construction, interaction with a park-brake system 11 and a park-brake monitoring-system 12, and functioning of a complimentary pair of a full-release-detection sensor 65 and a full-set-detection sensor 71 in accordance with the present invention the details of the configuration of one embodiment of the present invention that is currently utilized will be discussed in detail immediately below. It will of course be understood, as was mentioned above, that this currently utilized embodiment of the present invention is but one of numerous possible embodiments of the present invention and that all park-brake monitoring-systems 12 that are configured, interacted with the park-brake system 11 and other components of the vehicle 10, and function in accordance with the general teachings of this disclosure are considered to be within the purview of the present invention. In order that understanding of the currently utilized embodiment of the present invention be further facilitated it is suggested that the reader reference FIGS. 1, 2a, 2b, 3, 4, 5, 6, and 7 which are in accordance with the currently utilized embodiment of the present invention, while reading the following discussion related to the currently utilized embodiment of the present invention. The currently utilized embodiment of the present invention includes a vehicle 10 that has a park-brake system 11 including a park-brake-actuating component 18 that is a powered actuator 35. The powered actuator 35 of the currently utilized embodiment uses fluid pressure of a working fluid to retract the other park-brake-actuating components 18 and to, thus, effect the park-brake fully-released operating state of the park-brake system 11. The powered actuator 35 of the currently utilized embodiment of the present invention utilizes a spring 42 to actuate the other park-brake-actuating components 18 and to, thus, effect a park-brake fully-set operating state of the park-brake system 11. In the currently utilized embodiment of the present invention the park-brake monitoring-system 12 comprises a complimentary pair of a full-release-detection sensor 65 and a full-set-detection sensor 71 that includes a full-release-detection sensor 65 that is a position sensor 63 that senses the position of a park-brake-actuating component 18 of the park-brake system 11 and a full-set-detection sensor 71 that is a fluid-pressure sensor 67 that senses the fluid pressure of the working fluid that the powered actuator 35 utilizes to retract the other park-brake-actuating components 18. The relationships between the values and categories thereof of the set-degree-dependent parameters that the fluid pressure of the working fluid and the position of the park-brake-actuating component 18 constitute in the currently utilized embodiment of the present invention and the sensed-operating state signals that are produced by the full-release-detection sensor 65 and the full-set-detection sensor 71 are graphically illustrated in FIG. 6 in order to supplement the below description in providing the reader with a thorough understanding of the manner in which the full-set-detection sensor 71 and the full-release-detection sensor 65 produce and communicate to other components of the vehicle 10 sensed operating-state signals dependent upon the values of the fluid pressure and the position of the park-brake-actuating component 18. Of course it will be understood that in embodiments other than the currently utilized embodiment of the present invention a fluid-pressure sensor could be utilized as a full-release-detection sensor and a position sensor could be utilized as a full-set-detection sensor. It should also be mentioned that utilizing a fluid-pressure sensor as a full-set-detection sensor is particularly advantageous for many applications of the present invention because in many embodiments of park-brake systems 11 the fluid pressure of a working fluid that is utilized to actuate or retract the park-brake-actuating components 18 is a very reliable indicator of the degree to which the operating state of the park-brake system 11 is set. In the currently utilized embodiment of the present invention the fluid-pressure sensor 67 that is the full-set-detection sensor 71 is a fluid-pressure-activated switch 67 that is a binary-digital sensor that is constructed in such a manner that, when the fluid pressure which it senses has a value less than a switch-trigger value of the fluid-pressure-activated switch 67, it produces and communicates to other components of the vehicle 10 a logic low (binary-digital 0) signal. The fluid-pressure-activated switch 67 that is the full-set-detection sensor 71 of the currently utilized embodiment is further constructed in such a manner that, when the fluid pressure that it senses has a value greater than the switch-trigger value of the fluid-pressure-activated switch, it produces and communicates to other components of the vehicle 10 a logic high (binary-digital 1) signal. In the currently utilized embodiment of the present invention the fluidpressure-activated switch 67 that is the full-set-detection sensor 71 has a switch-trigger value that is the same as the boundary value between park-brake fully-set values of the fluid pressure and park-brake not-fully-released/not-fully-set values of the fluid pressure. Because the park-brake system 11 of the currently utilized embodiment is configured in such a manner that the working fluid is utilized to effect a park-brake fully-released operating state of the park-brake system 11, those values of the fluid pressure of the working fluid that are less than the boundary value are the park-brake fully-set values of the fluid pressure and those values of the fluid pressure that are greater than the boundary value are the park-brake not-fully-released/not-fully-set values of the fluid pressure. Thus, in the currently utilized embodiment of the present invention the fluid-pressure-activated switch 67 that is the full-set-detection sensor 71 produces and communicates to other components of the vehicle 10 a park-brake fully-set signal (which is a logic low signal) anytime the fluid pressure of the working fluid has a park-brake fully-set value (which is any value below the boundary value between the park-brake fully-set values and the park-brake not-fully-released/not-fully-set values). Likewise, the fluid-pressure-activated switch 67 that is the full-set-detection sensor 71 of the currently utilized embodiment produces and communicates to other components of the vehicle 10 a park-brake not-fully-set signal (which is a logic high signal) anytime the fluid pressure of the working fluid has a park-brake not-fully-released/not-fully-set value or a park-brake fully-released value (which is any value above the boundary value between the park-brake fully-set values and the park-brake not-fully-released/not-fully-set values). Of course it will be understood that embodiments other than the currently utilized embodiment of the present invention could be configured such that a full-set-detection sensor 71 produces and communicates the opposite logic low and logic high signals to other components of the vehicle 10 as does the full-set-detection sensor 71 of the currently utilized embodiment for a given set of circumstances. Many different constructions of fluid-pressure-activated switches that sense a fluid pressure and produce and communicate either a logic low signal or a logic high signal dependent upon whether the fluid pressure has a value less than or greater than the switch-trigger value of the fluid-pressure-activated switch are well-known. Of course it will be understood that, in embodiments other than the currently utilized embodiment of the present invention, fluid pressure sensors of other constructions, including constructions that produce analog signals, may be utilized as full-set-detection sensors and/or full-release-detection sensors of a park-brake monitoring-system 12 in accordance with the present invention. In the currently utilized embodiment of the present invention the position sensor 63 that is the full-release-detection sensor 65 is a binary-digital position-sensor 75. This binary-digital position-sensor 75 is constructed and interacted with the park-brake-actuating component 18 the position of which it senses in such a manner that, when the park-brake-actuating component 18 has any position upon a first side of a switch-trigger position of the park-brake-actuating component 18 relative to the binary-digital position-sensor 75, the binary-digital position-sensor 75 produces and communicates a logic high (binary-digital 1) signal to other components of the vehicle 10. This binary-digital position-sensor 75 is also constructed and interacted with the park-brake-actuating component 18 the position of which it senses in such a manner that, when the park-brake-actuating component 18 has any position upon a second side of the switch-trigger position of the park-brake-actuating component 18 relative to the binary-digital position-sensor 75, the binary-digital position-sensor 75 produces and communicates a logic low (binary-digital 0) signal to other components of the vehicle 10. In the currently utilized embodiment of the present invention the binary-digital position-sensor 75 that is the full-release-detection sensor 65 is constructed and interacted with the park-brake-actuating component 18 the position of which it senses in such a manner that the switch-trigger position of the park-brake-actuating component 18 relative to the binary-digital position-sensor 75 is equal to the boundary value between the park-brake fully-released values and the park-brake not-fully-released/not-fully-set values of the position of the park-brake-actuating component 18. In the currently utilized embodiment of the present invention the relative positioning of the full-release-detection sensor 65 and the park-brake-actuating component 18, the position of which it senses, is further such that, when the park-brake-actuating component 18 has any of its park-brake fully-released values, it is disposed on the first side of its switch-trigger position relative to the binary-digital position-sensor 75 that is the full-release-detection sensor 65 and the binary-digital position-sensor 75 that is the full-release-detection sensor 65 produces and communicates a park-brake fully-released signal (logic high) to other components of the vehicle 10. Thus, in the currently utilized embodiment of the present invention the relative positioning of the binary-digital position-sensor 75 that is the full-release-detection sensor 65 and the park-brake-actuating component 18, the position of which it senses, is further such that, when the park-brake-actuating component 18 has any of its park-brake not-fully-released/not-fully-set values, it is disposed on the second side of its switch-trigger position relative to the binary-digital position-sensor 75 that is the full-release-detection sensor 65 and the-binary-digital position-sensor 75 that is the full-release-detection sensor 65 produces and communicates a park-brake not-fully-released signal (logic low) to other components of the vehicle 10. There are many different constructions of binary-digital position-sensors 75, including but not limited to contact switches and optical sensors that could be utilized to function in a similar manner as the full-release-detection sensor 65 of the currently utilized embodiment in embodiments of park-brake monitoring-systems similar to the currently utilized embodiment thereof. In the currently utilized embodiment of the present invention the binary-digital position-sensor 75 that constitutes the full-release-detection sensor 65 is a hall-effect device 76 and the park-brake monitoring-system 12 includes a magnet 47 positioned near the hall-effect device 76 and a position-marking structure 30 that is constructed of ferrous material and that is mounted to the park-brake-actuating component 18 the position of which the full-release-detection sensor 65 senses. Of course it will be understood that hall-effect devices that produce analog signals could also be utilized as operating-state sensor(s) 48 of a park-brake monitoring-system 12 in accordance with the present invention. The intensity of magnetic flux that the hall-effect device 76 that is the full-release-detection sensor 65 is exposed to varies with the position of the position-marking structure 30 relative to the hall-effect device 76 and, thus, with the position of the park-brake-actuating component 18 to which the position-marking structure 30 is attached to. The hall-effect device 76 that is the full-release-detection sensor 65 is constructed and calibrated in such a manner that, the intensities of magnetic flux to which the hall-effect device 76 is exposed to when the position-marking structure 30 and the hall-effect device 76 are aligned with one another cause the hall-effect device 76 to produce and communicate a logic low signal to other components of the vehicle 10 and the intensity of the magnetic flux that the hall-effect device 76 is exposed to when the hall-effect device 76 and the position-marking structure 30 are not aligned with one another causes the hall-effect device 76 to produce and communicate a logic high signal to other components of the vehicle 10. The position-marking structure 30 of the currently utilized embodiment of the present invention is positioned upon the park-brake-actuating component 18 to which it is attached in such a position that, when the park-brake-actuating component 18 that it is attached to is disposed in its switch-trigger position relative to the binary-digital position-sensor 75 that is the full-release-detection sensor 65, an outer edge of the position-marking structure 30 is aligned with the hall-effect device 76 that is the full-release-detection sensor 65. The position-marking structure 30 of the currently utilized embodiment of the present invention is further positioned upon the park-brake-actuating component 18 to which it is attached in such a position that, when the park-brake-actuating component 18 is disposed to the first side of its switch-trigger position relative to the hall-effect device 76, the position-marking structure 30 is disposed to a side of (is not aligned with) the hall-effect device 76 that is the full-release-detection sensor 65 of the currently utilized embodiment. As a result, the position-marking structure 30 of the currently utilized embodiment of the present invention is further positioned upon the park-brake-actuating component 18 to which it is attached in such a position that, when the park-brake-actuating component 18 is disposed to the second side of its switch-trigger position relative to the hall-effect device 76, the position-marking structure 30 is aligned with the hall-effect device 76 that is the full-release-detection sensor 65 of the currently utilized embodiment. Thus, the above-described functioning of the hall-effect device 76 that is the full-release-detection sensor 65 of the currently utilized embodiment is effected. Of course it will be understood that embodiments other than the currently utilized embodiment of the present invention could be configured such that a full-release-detection sensor 65 produces and communicates the opposite logic low and logic high signals to other components of the vehicle 10 as does the full-release-detection sensor 65 of the currently utilized embodiment for a given set of circumstances. Of course it will also be understood that in embodiments other than the currently utilized embodiment position sensors of types other than binary-digital position-sensors 75 may be utilized as full-release-detection sensors 65 and/or full-set-detection sensors 71 of park-brake monitoring-systems 12.

As is described above, in the currently utilized embodiment of the present invention both the park-brake fully-released signal produced by the full-release-detection sensor 65 and the park-brake not-fully-set signal produced by the full-set-detection sensor 71 have a logic high value and both the park-brake not-fully-released signal produced by the full-release-detection sensor 65 and the park-brake fully-set signal produced by the full-set-detection sensor 71 have logic low values. In order for the park-brake monitoring-system 12 of the currently utilized embodiment to function properly, however, park-brake fully-released signals and park-brake not-fully-set signals must be discernible from one another and park-brake not-fully-released signals and park-brake fully-set signals must be discernible from one another. In the currently utilized embodiment of the present invention the above-mentioned sensed operating-state signals that have the same value are made discernible from one another by separating them in space. In the currently utilized embodiment of the present invention park-brake fully-released signals and park-brake not-fully-set signals are communicated through different physical channels, thereby making them discernible from one another in spite of the fact that they have the same value. Likewise, in the currently utilized embodiment of the present invention park-brake not-fully-released signals and park-brake fully-set signals are communicated through different physical channels, thereby making them discernible from one another in spite of the fact that they have the same value.

As is true for the currently utilized embodiment of the present invention, in any embodiment of the present invention in order for a park-brake monitoring-system 12 to function properly it must be configured and interacted with the park-brake system 11 and other components and systems of the vehicle 10 in such a manner that the signals of each one of the types that are described in this disclosure that that park-brake monitoring-system 12 produces must be discernible from the signals of each of the other types of signals that are described in this disclosure and that that park-brake monitoring-system 12 produces. There are a number of manners that are well-known to and or easily imaginable by one of ordinary skill in the art to make signals of various types that are produced by a park-brake monitoring-system 12 discernible from one another in order to ensure proper functioning of the park-brake monitoring-system 12. Obviously signals that have different values are discernible from one another. As was described above, signals can be made discernible from one another by separating the signals in space by communicating them through different physical channels. Supplying unique identifier tags with different signals is yet another way to make them discernible from one another. Yet another way to make different signals discernable from one another is to separate their communication in time, such as is commonly done with multiplexed electrical systems like the one disclosed in U.S. Pat. No. 4,809,177 to Navistar International Transportation Corp. It is also contemplated that a person of ordinary skill in the art could, without undue experimentation, contrive other ways of producing and communicating different types of signals in different manners so that they are discernible from one another. It is further submitted that park-brake monitoring-systems 12 that are in accordance with the teachings of this disclosure that utilize future-conceived manners of producing and communicating sensed-operating state signals and monitoring signals (which will be described in greater detail below) are considered to be within the purview of the present invention.

Any of the signals produced by the park-brake monitoring-system 12 of the present invention may be of any form and in any medium that enables functionality of the park-brake monitoring-system 12 in accordance with the teachings of this disclosure. The signals may be digital or analog. Further more the signals may be embodied in numerous different mediums which include but are not limited to electricity, light, and pressurized fluid. It will also be understood that in some cases a lack of a signal is, in fact, a signal. For example, one or more components of a vehicle 10 may be configured in such a manner that, when they receive zero voltage from a sensor that produces electrical voltage signals, the component(s) perform different actions than they would if they received a non-zero voltage input from the sensor that produces electrical voltage signals. In an analogous manner communication by a sensor to a component of a zero quantum of any signal-relaying means including pressure, light, and sound may be considered to be a communication of a signal in any case where the component is configured in such a manner that it functions differently upon the receipt of the zero quantum of the signal-relaying means than it does upon the receipt of a non-zero quantum of the signal-relaying means.

In some embodiments of the present invention, including the currently utilized embodiment, the park-brake monitoring-system 12 also includes one or more logic device(s) 15, which are communicatively linked with the operating-state sensors 48 of the park-brake monitoring-system 12. Such logic device(s) 15 of a park-brake monitoring-system 12 operate according to logic to produce monitoring signals that are dependent upon sensed operating-state signals produced and communicated to the logic device(s) 15 by the operating-state sensors 48. The monitoring signals that the logic device(s) 15 of the park-brake monitoring-system 12 may produce include signals indicative of a value of the operating state of the park-brake system 11 and/or error signals that indicate that the park-brake system 11 and/or the park-brake monitoring-system 12 is malfunctioning. The monitoring signals produced by the logic device(s) 15 of a park-brake monitoring-system 12 according to the present invention may be communicated from one portion of the logic device(s) 15 to another portion of the logic device(s) 15 in order to effect operation of the logic device(s) 15 in a manner appropriate for the circumstances that the monitoring signals are implicative of. Additionally or alternatively the monitoring signals produced by the logic device(s) 15 of a park-brake monitoring-system 12 according to the present invention may be communicated to other components and/or systems of the vehicle 10 and/or other device(s) such as vehicle maintenance device(s) in order to effect operation of those components, systems, and/or device(s) in a manner appropriate for the circumstances that the monitoring signals are implicative of.

The logic device(s) 15 of a park-brake monitoring-system 12 may be one of any of a number of different designs and may be interacted with the other components of the park-brake monitoring-system 12 in any of a number of different ways. The logic device(s) 15 may be a collection of discrete gates, resistors, transistors, or other electrical components capable of interpreting the signals received from the operating-state sensor 48 and effecting appropriate outputs as described in greater detail above and below. In some embodiments the logic device(s) 15 of the park-brake monitoring-system 12 consist of a microcomputer running software programs. In still other embodiments the logic device(s) 15 comprise a combination of discrete gates, resistors, transistors or other electrical components communicatively linked to one or more microcomputers running software programs. The factors that control the logic according to which the logic device(s) 15 operate are dependent upon the construction of the logic device(s) 15 themselves. The construction of and the manner of communicative linkage of any discrete gates, resistors, transistors, other electrical components, and/or microcomputers of the logic device(s) 15 along with any software programs that any microcomputers of the logic device(s) 15 run, control the logic according to which the logic device(s) 15 will operate. It is anticipated that one of ordinary skill in the art could, without undue experimentation, easily conceive many different configurations of the logic device(s) 15 and any software programs that they run in order to effect operation of the logic device(s) 15 in a manner consistent with the operation of the logic device(s) 15 as outlined in this disclosure.

A park-brake monitoring-system 12 according to the present invention may comprise various types of indicators that can be activated in order to communicate the value of the operating state of the park-brake system 11 and/or to communicate the existence of a malfunction of the park-brake system 11 and/or the park-brake monitoring-system 12 to an operator of the vehicle 10. Each of the indicators of a park-brake monitoring-system 12 according to the present invention comprises one or more visual indicators, such as lights, and/or one or more audio indicators, such as buzzers or bells. Indicators that the park-brake monitoring-system 12 of:the present invention may comprise include, but are not limited to, a park-brake-set indicator 17, a park-brake-released indicator 22, and a park-brake system/park-brake monitoring-system malfunction-indicator 38. Each of the indicators of a park-brake monitoring-system 12 according to the present invention may comprise separate and distinct components from each of the other indicators. For example, as is shown in FIGS. 11a, 11b, and 11c, a park-brake monitoring-system 12 may comprise a park-brake-set indicator 17 that comprises a first light, a park-brake-released indicator 22 that comprises a second light, and a park-brake system/park-brake monitoring-system malfunction-indicator 38 that comprises a third light. Alternatively, a given component may function as part of more than one indicator of the park-brake monitoring-system 12. For example, a light may function as a park-brake-set indicator 17 when it is lit red, as a park-brake-released indicator 22 when it is not lit, and as a park-brake system/park-brake monitoring-system malfunction-indicator 38 when it is flashing red. As a result, while a park-brake monitoring-system 12 may in fact comprise a park-brake-released indicator 22 and a park-brake-set indicator 17 that are separate and distinct components from one another and each of which functions only as a park-brake-released indicator 22 and a park-brake-set indicator 17 respectively, any park-brake monitoring-system 12 that comprises a park-brake-released indicator 22 effectively comprises a park-brake-set indicator 17. This is true due to the fact that, in the absence of dedicated component(s) that function as a park-brake-set indicator 17, a park-brake-released indicator 22 effectively functions as a park-brake-set indicator 17 when it is not activated to indicate to a user of the vehicle 10 that the park-brake system 11 has a released operating state. In a corollary manner, while a park-brake monitoring-system 12 may in fact comprise a park-brake-released indicator 22 and a park-brake-set indicator 17 that are separate and distinct components from one another and each of which functions only as a park-brake-released indicator 22 and a park-brake-set indicator 17 respectively, any park-brake monitoring-system 12 that comprises a park-brake-set indicator 17 effectively comprises a park-brake-set indicator 22. This is true due to the fact that, in the absence of dedicated component(s) that function as a park-brake-released indicator 22, a park-brake-set indicator 17 effectively functions as a park-brake-released indicator 22 when it is not activated to indicate to a user of the vehicle 10 that the park-brake system 11 has a set operating state. Additionally, the indicators of a park-brake monitoring-system 12 according to the present invention may be shared with other systems of the vehicle 10. For instance, a park-brake system/park-brake monitoring-system malfunction-indicator 38 of a park-brake monitoring-system 12 according to the present invention may be one and the same component as a service-brake malfunction-indicator of the vehicle 10. When a park-brake monitoring-system 12 that is in accordance with the present invention and that includes one or more of the above-mentioned indicators is operated, the activation or lack of activation of the indicators is performed dependent at least in part upon the sensed operating-state signals produced by the operating-state sensor(s) 48 of the park-brake monitoring-system 12. In some cases one or more of the indicators are directly communicatively linked to the operating-state sensor(s) 48 in such a manner that the production and communication to the indicators of certain sensed operating-state signals causes activation of the indicator. For example, a park-brake-set indicator 17 may be configured and communicatively linked to a full-set-detection sensor 71 of the park-brake monitoring-system 12 in such a manner that, when the full-set-detection sensor 71 produces and communicates a park-brake fully-set signal to the park-brake-set indicator 17, the park-brake-set indicator 17 is activated. In other cases one or more of the indicators of a park-brake monitoring-system 12 are communicatively linked to and are activated by logic device(s) 15 of the park-brake monitoring-system 12 in a manner dependent at least partially upon the sensed operating-state signals produced and communicated to those logic device(s) 15 by the operating-state sensor(s) 48.

Figure 2A:
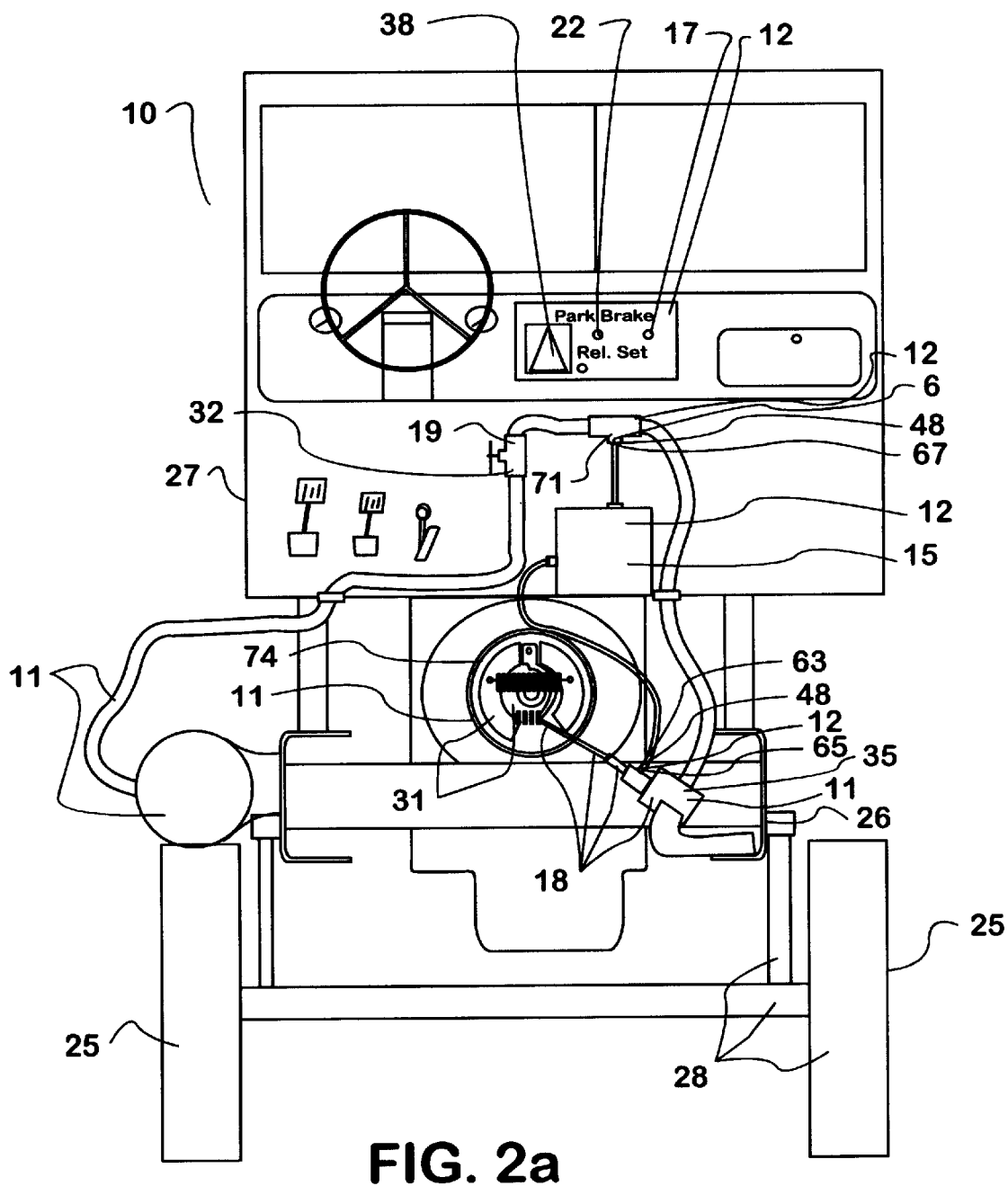
FIG. 2a is a sectional view of the vehicle shown in FIG. 1 through line II—II showing the park-brake system in a fully-released operating state.
Figure 2B:
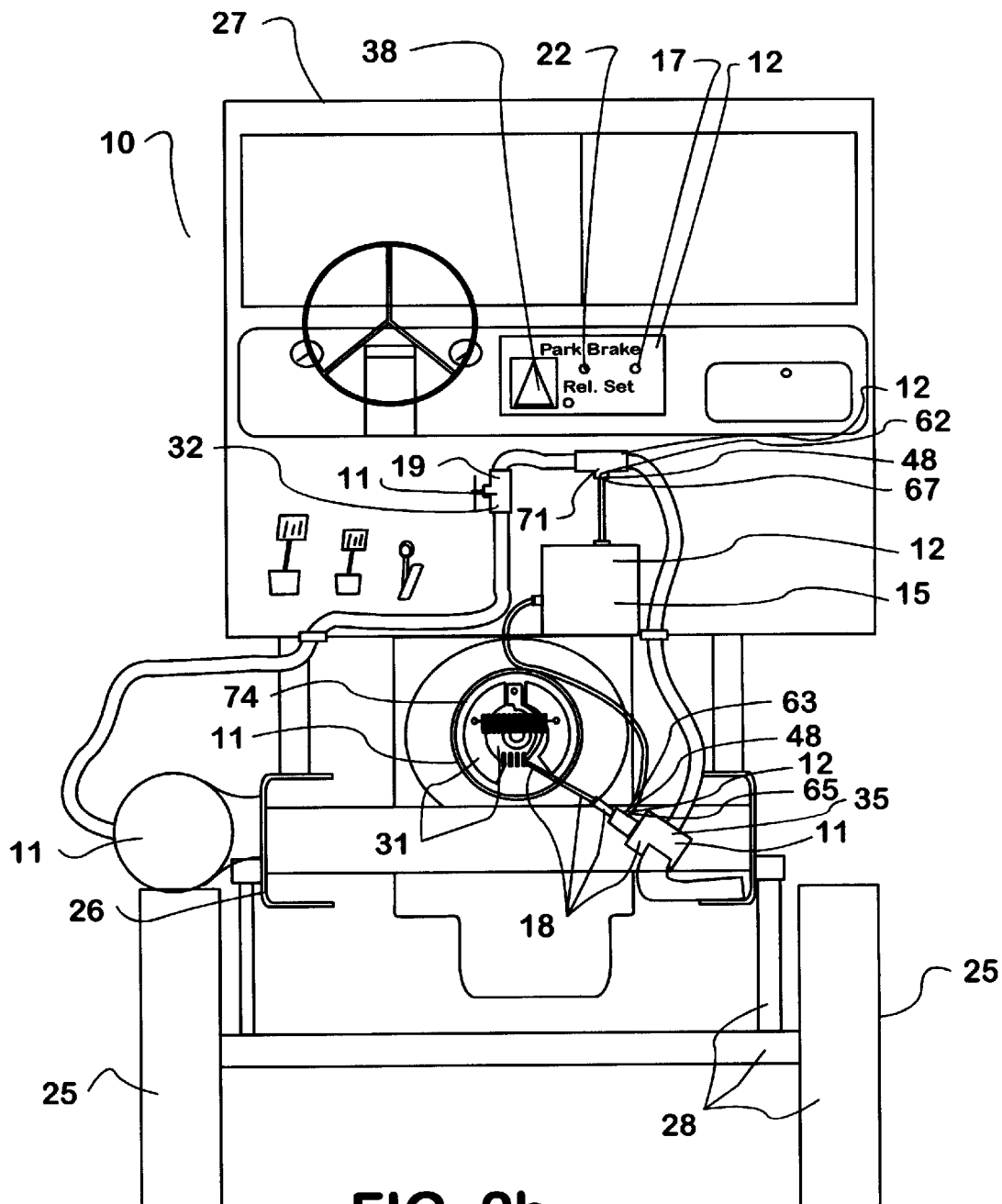
FIG. 2b is a sectional view of the vehicle shown in FIG. 1 through line II—II showing the park-brake system in a fully-set operating state.
Figure 3:
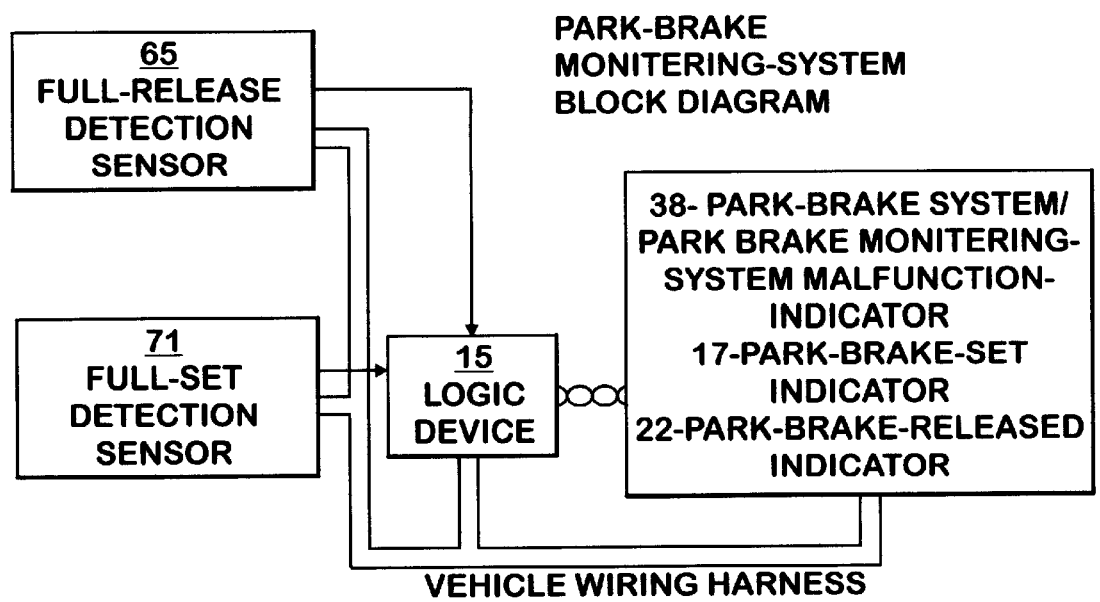
FIG. 3 is a block diagram of one embodiment of a park-brake monitoring-system according to the present invention.
Figure 5:
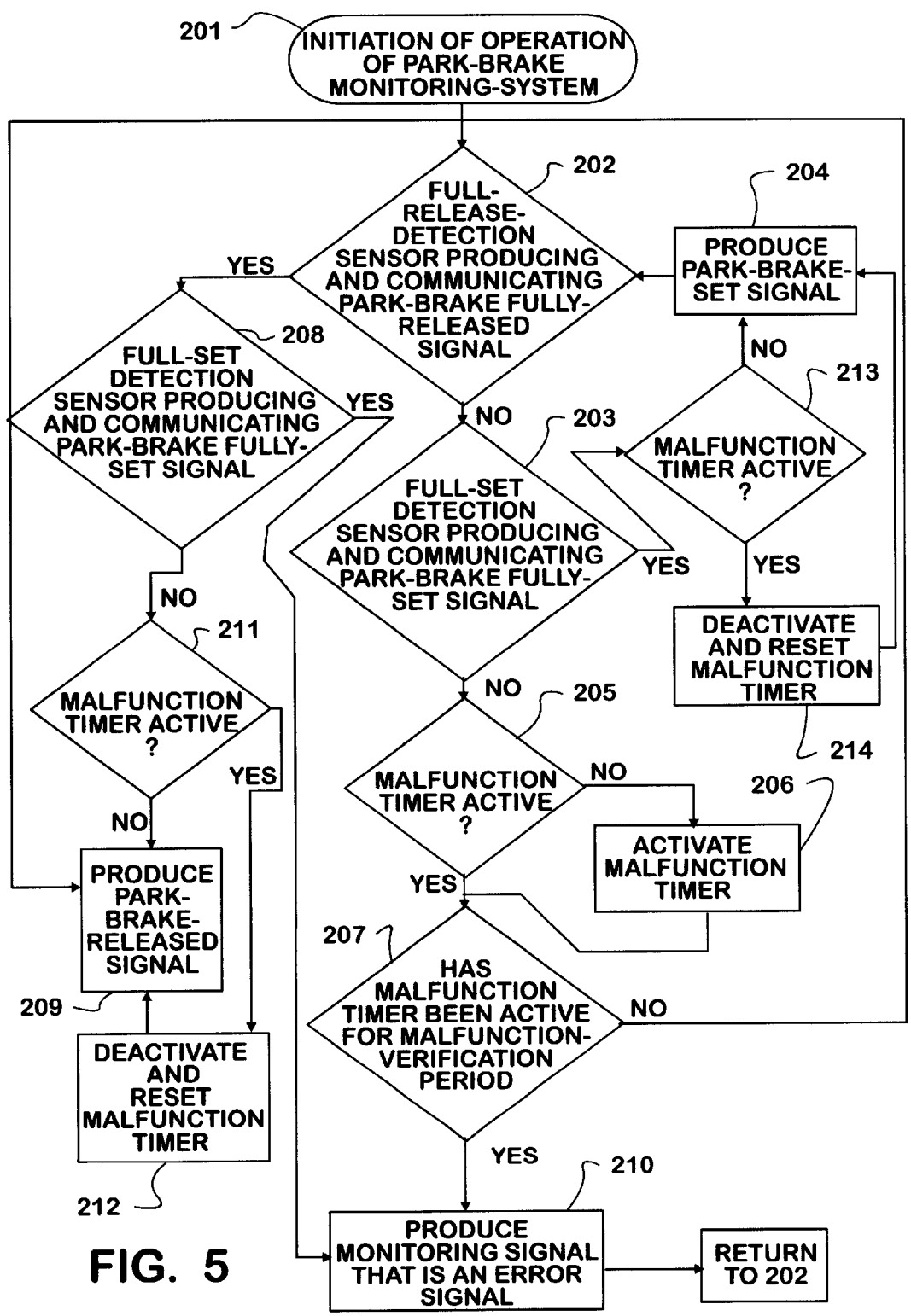
FIG. 5 is a flow chart illustrating a subset of an algorithm according to which logic devices of park-brake monitoring-systems according to the present invention may operate.

The logic according to which the logic device(s) 15 of the currently utilized embodiment of a park-brake monitoring-system 12 of the present invention operates will now be described with reference to FIG. 5. FIG. 5 is a flow chart that outlines a subset of the algorithm according to which one or more of the logic device(s) 15 of the above-mentioned currently utilized embodiment of the present invention operates. It will of course be understood that other embodiments of the present invention may be configured in such a manner that the logic device(s) 15 thereof execute more or less than all of the steps or even none of the steps that are represented in FIG. 5 and described below and/or may execute some or all of the steps that are represented in FIG. 5 and described below in different orders than they are shown in FIG. 5 and described below. As is reflected in the discussion below and in FIG. 5, the algorithm according to which the logic device(s) 15 of the currently utilized embodiment of the present invention operates includes provisions for causing the logic device(s) 15 to produce monitoring signals that include park-brake-set signals and park-brake-released signals. The production of a monitoring signal that is a park-brake-set signal by the logic device(s) 15 of the currently utilized embodiment of the park-brake monitoring-system 12 is implicative that the park-brake system 11 has a park-brake fully-set operating state and enables tailoring of the operation of one or more systems of the vehicle 10 to be appropriate for circumstances in which the park-brake system 11 has a park-brake fully-set operating state. The production of a monitoring signal that is a park-brake-released signal by the logic device(s) 15 of the currently utilized embodiment of the park-brake monitoring-system 12 is implicative that the park-brake system 11 has a park-brake fully-released operating state and enables tailoring of the operation of one or more systems of the vehicle 10 to be appropriate for circumstances in which the park-brake system 11 has a park-brake fully-released operating state. At the step of operation of the logic device(s) 15 of the park-brake monitoring-system 12 of the currently utilized embodiment that is represented by step 201 of FIG. 5 operation of the park-brake monitoring-system 12 is initiated. This step generally occurs when the ignition power of the vehicle 10 is switched from off to on. At step 202 a determination is made as to whether or not the full-release-detection sensor 65 is producing and communicating a park-brake fully-released signal to the logic device(s) 15 of the park-brake monitoring-system 12. If at step 202 it is determined that the full-release-detection sensor 65 is not producing and communicating a park-brake fully-released signal to the logic device(s) 15, execution of the algorithm proceeds to step 203 where it is determined whether or not the full-set-detection sensor 71 is producing and communicating a park-brake fully-set signal to the logic device(s) 15. If at step 203 it is determined that a park-brake fully-set signal is being produced and communicated to the logic device(s) 15 by the full-set-detection sensor 71, execution of the algorithm proceeds to step 213 where it is determined whether or not a malfunction timer, which will be discussed in greater detail below, is active. If at step 213 it is determined that the malfunction timer is not active, execution of the algorithm proceeds to step 204 where the logic device(s) 15 produce a monitoring signal that is a park-brake-set signal. After step 204 execution of the algorithm returns to step 202. If at step 202 it is determined that a park-brake fully-released signal is being produced and communicated to the logic device(s) 15 by the full-release-detection sensor 65, execution of the algorithm proceeds to step 208 where it is determined whether or not the full-set-detection sensor 71 is producing and communicating a park-brake fully-set signal to the logic device(s) 15. If at step 208 it is determined that the full-set-detection sensor 71 is not producing and communicating a park-brake fully-set signal to the logic device(s) 15, execution of the algorithm proceeds to step 211 where it is determined if the malfunction timer is active. If at step 211 it is determined that the malfunction timer is not active, execution of the algorithm proceeds to step 209 where the logic device(s) 15 produce a monitoring signal that is a park-brake-released signal. After step 209 execution of the algorithm returns to step 202. Thus, upon initiation of operation of the park-brake monitoring-system 12, if the logic device(s) 15 receive an uncontested park-brake fully-set signal before receiving an uncontested park-brake fully-released signal the logic device(s) 15 produce a monitoring signal that is a park-brake-set signal. Alternatively, if, upon initiation of operation of the park-brake monitoring-system 12 the logic device(s) 15 receive an uncontested park-brake fully-released signal before receiving an uncontested park-brake fully-set signal the logic device(s) 15 produce a monitoring signal that is a park-brake-released signal. As can also be understood from the foregoing discussion and FIG. 5, subsequent to the production of a monitoring signal that is a park-brake-set signal the logic device(s) 15 produce a monitoring signal that is a park-brake-released signal when and only when an uncontested park-brake fully-released signal is subsequently received from the full-release-detection sensor 65. As can additionally be understood from the foregoing discussion and FIG. 5, subsequent to the production of a monitoring signal that is a park-brake-released signal, the logic device(s) 15 produce a park-brake-set signal when and only when an uncontested park-brake fully-set signal is subsequently produced and communicated to the logic device(s) 15 by the full-set-detection sensor 71. Functioning of the logic device(s) 15 of the currently utilized embodiment of the present invention in this manner increases the likelihood that, when the operating state of the park-brake system 11 is transitioned from a fully-set to fully-released, the manner in which other systems of the vehicle 10 are operated is not transitioned to one that is only appropriate for circumstances when the park-brake system 11 has a fully-released operating state before the park-brake system 11 does, in fact, have a fully-released operating state. For instance, functioning of the logic device(s) 15 in this manner increases the likelihood that the vehicle 10 will not be set into motion by the driver during the period when the park-brake system 11 is still transitioning from a park-brake fully-set operating state to a park-brake fully-released operating state. Functioning of the logic device(s) 15 of the currently utilized embodiment of the present invention in the manner described above and illustrated in FIG. 5 also increases the likelihood that, when the operating state of the park-brake system 11 is transitioned from fully-released to fully-set, the manner in which other systems of the vehicle 10 are operated is not transitioned to one that is only appropriate for circumstances when the park-brake system 11 has a fully-set operating state before the park-brake system 11 does, in fact, have a fully-set operating state. For instance, functioning of the logic device(s) 15 in this manner increases the likelihood that a driver of the vehicle will not leave the vehicle unattended while the park-brake system 11 is still transitioning from a fully-released to a fully-set operating state.

The algorithm according to which the logic device(s) 15 of the currently utilized embodiment of the present invention operate further includes provisions for detecting malfunction of the park-brake system 11 and/or the park-brake monitoring-system 12 and producing monitoring signals that are error signals. The production of a monitoring signal that is an error signal by the logic device(s) 15 is implicative that the park-brake system 11 and/or the park-brake monitoring-system 12 has malfunctioned and enables tailoring of the operation of one or more systems of the vehicle 10 in a manner appropriate for circumstances in which the park-brake system 11 and/or the park-brake monitoring-system 12 have malfunctioned. One set of circumstances that is indicative that the park-brake system 11 and/or the park-brake monitoring-system 12 has malfunctioned is the simultaneous communication to the logic device(s) 15 of a park-brake fully-set signal and a park-brake fully-released signal. As can be seen in FIG. 5, if at step 202 it is determined that the full-release-detection sensor 65 is communicating a park-brake fully-released signal to the logic device(s) 15 and at step 208 it is determined that the full-set-detection sensor 71 is communicating a park-brake fully-set signal to the logic device(s) 15, execution of the algorithm proceeds to step 210 where the logic device(s) 15 produce a monitoring signal that is an error signal. Another set of circumstances that is indicative that the park-brake system 11 and/or the park-brake monitoring-system 12 has malfunctioned is the lack of communication to the logic device(s) 15 of at least one uncontested park-brake fully-set signal or uncontested park-brake fully-released signal for a period of time greater than it is reasonable to expect the park-brake system 11 to take to transition between a park-brake fully-set operating state and a park-brake fully-released operating state. As can be seen in FIG. 5, if at step 202 it is determined that the full-release-detection sensor 65 is not producing and communicating a park-brake fully-released signal to the logic device(s) 15 and it is determined at step 203 that the full-set-detection sensor 71 is not producing and communicating a park-brake fully-set signal to the logic device(s) 15, execution of the algorithm proceeds to step 205 where it is determined if the malfunction timer is active. If at step 205 it is determined that the malfunction timer is not active, the malfunction timer is activated at step 206. After the malfunction timer is activated at step 206 or, if it is determined at step 205 that the malfunction timer is already active, after step 205, the execution of the algorithm proceeds to step 207 where it is determined whether or not the malfunction timer has been active for a malfunction-verification period. A malfunction-verification period, which will be discussed in greater detail below, is a predetermined period of time that it is desired to have the logic device(s) 15 wait, subsequent to initial existence of circumstances that are implicative of a malfunction of the park-brake system 11 and/or the park-brake monitoring-system 12, before producing a monitoring signal that is an error signal. As is also discussed in greater detail below different malfunction-verification periods with different lengths may be utilized for different circumstances of operation of the park-brake monitoring-system 12. If at step 207 it is determined that the malfunction timer has been active for the appropriate malfunction-verification period, execution of the algorithm proceeds to step 210 where the logic device(s) 15 produce a monitoring signal that is an error signal after which execution of the algorithm returns to step 202. Alternatively, if at step 207 it is determined that the malfunction timer has not been active for the appropriate malfunction-verification period, execution of the algorithm returns to step 202. Thus, it can be seen that in the currently utilized embodiment if there is a lack of communication of at least one uncontested park-brake fully-set signal or uncontested park-brake fully-released signal to the logic device(s) 15 for an appropriate malfunction-verification period, the logic device(s) 15 produce a monitoring signal that is an error signal. The algorithm according to which the logic device(s) 15 of the currently utilized embodiment of the present invention operate further includes provisions for deactivating and resetting the malfunction timer if an uncontested park-brake fully-released signal or an uncontested park-brake fully-set signal is received by the logic device(s) 15 subsequent to activation of the malfunction timer and before the malfunction timer has been active for an appropriate malfunction-verification period. As can be seen in FIG. 5 if it is determined at steps 202 and 203 that an uncontested park-brake fully-set signal is being communicated to the logic device(s) 15, a determination is made at step 213 as to whether or not the malfunction timer is active and if the malfunction timer is active it is deactivated and reset at step 214. In a similar manner, as can be seen in FIG. 5 if it is determined at steps 202 and 208 that an uncontested park-brake fully-released signal is being communicated to the logic device(s) 15, a determination is made at step 211 as to whether or not the malfunction timer is active and if the malfunction timer is active it is deactivated and reset at step 209. Of course it will be understood that other configurations of park-brake monitoring-systems 12 according to the present invention may be such that there are other events that will cause the logic device(s) 15 to deactivate and/or reset the malfunction timer. For instance, some park-brake monitoring-systems 12 may be configured in such a manner that, if, during a period when neither a park-brake fully-released signal or a park-brake fully-set signal is being communicated to the logic device(s) 15 and the malfunction timer is active as a result thereof, an operator of the vehicle 10 utilizes an operator interface 32 of the park-brake system 11 to change the selected operating state of the park-brake system 11, the logic device(s) 15 reset the malfunction timer. Functioning of a park-brake monitoring-system 12 in such a manner ensures that the logic device(s) 15 thereof will not produce a monitoring signal that is an unwarranted error signal simply because a non-decisive operator of the vehicle 10 rapidly changes the selected operating state of the park-brake system 11 from, for example, set to released and back to set again before the park-brake system 11 has time to transition from a park-brake fully-set operating state to a park-brake fully-released operating state and back to a park-brake fully-set operating state again.

As was discussed above, during certain circumstances of operation of a park-brake monitoring-system 12 according to the present invention the logic device(s) 15 may, upon initial existence of circumstances that are implicative of malfunction of the park-brake system 11 and/or park-brake monitoring-system 12, wait for a malfunction-verification period before producing a monitoring signal that is an error signal. Configuring a park-brake monitoring-system 12 in such a manner that the logic device(s) 15 thereof wait for a malfunction-verification period before producing a monitoring signal that is an error signal reduces the likelihood that the logic device(s) 15 will produce unwarranted error signals. The logic according to which the logic device(s) 15 operate may be such that the length of the malfunction-verification period is the same for every set of circumstances in which a malfunction-verification period is utilized. Alternatively, the logic according to which the logic device(s) 15 operate may be such that there are multiple different lengths of malfunction-verification periods that are defined thereby and each of which different lengths of malfunction-verification periods is utilized by the logic device(s) 15 in different circumstances than those in which others of the different length malfunction-verification periods would be utilized. One length of malfunction-verification period that it is apposite for the logic device(s) 15 to use, when neither an uncontested park-brake fully-released signal or an uncontested park-brake fully-set signal is being communicated to the logic device(s) 15, is a malfunction-verification period that is equal to a maximum length of time that it can be reasonably expected for the park-brake system 11 to take to transition between a park-brake fully-set operating state and a park-brake fully-released operating state. For example, in one embodiment of a vehicle 10 according to the present invention the park-brake system 11 is constructed in such a manner that the transition periods of the park-brake system 11 between its park-brake fully-set operating state and its park-brake fully-released operating state are all likely to be less than 5 seconds and the logic according to which the logic device(s) 15 operate is configured such that the logic device(s) 15 utilize a malfunction-verification period of a length of 5 seconds during circumstances when neither an uncontested park-brake fully-released signal or an uncontested park-brake fully-set signal is being communicated to the logic device(s) 15.

It should be understood that each of the types of sensed operating-state signals and monitoring signals discussed in this disclosure that a park-brake monitoring-system 12 according to the present invention may produce could include sub-types of signals. For instance, a park-brake not-fully-released signal is a type of signal that may actually be constituted by multiple different types of park-brake not-fully-released signals the production of which is driven by and is indicative of different degrees to which the operating state of the park-brake system 11 is set. It is submitted that while such a configuration of a park-brake monitoring-system 12 may enable more refined operation of a vehicle 10 of which it is a part, such an embodiment of a park-brake monitoring-system 12 is an embodiment of the present invention and with respect to this disclosure each sub-type of park-brake not-fully-released signal is simply a park-brake not-fully-released signal. Likewise it is submitted that any other park-brake monitoring-system 12 that is in accordance with this disclosure and that produces signals that are sub-types of any of the types of sensed operating-state signals and/or monitoring signals discussed in this disclosure is an embodiment of the present invention and that, with respect to this disclosure, any such sub-types of the types of signals discussed in this disclosure are simply considered to be signals of the types discussed in this disclosure.

As was mentioned above, in some embodiments of the present invention, including the currently utilized embodiment of the present invention, a park-brake monitoring-system 12 may comprise a park-brake-released indicator 22 and a park-brake-set indicator 17 that can be activated to indicate the existence of the park-brake system 11 in its respective released and set operating states to a user of the vehicle 10. In the currently utilized embodiment of the present invention the park-brake monitoring-system 12 comprises a park-brake-set indicator 17 that is communicatively linked to the logic device(s) 15 of the park-brake monitoring-system 12. In the currently utilized embodiment of the present invention the park-brake monitoring-system 12 is configured in such a manner that the logic device(s) 15 thereof operate according to logic that causes them to produce park-brake-set signals and park-brake-released signals during certain circumstances of operation of the park-brake system 11 and the park-brake monitoring-system 12. In the currently utilized embodiment of the present invention the park-brake monitoring-system 12 is configured in such a manner that the logic device(s) 15 operate according to logic such that anytime the logic device(s) 15 produce a park-brake-set signal the logic device(s) 15 also activate the park-brake-set indicator 17 to indicate to a user of the vehicle 10 that the park-brake system 11 has a set operating state. The logic according to which the logic device(s) 15 of the currently utilized embodiment operate is further such that, once the logic device(s) 15 have activated the park-brake-set indicator 17 the logic device(s) 15 further cause the park-brake-set indicator 17 to remain activated until the logic device(s) 15 produce a park-brake-released signal or until operation of the park-brake monitoring-system 12 is terminated. The logic according to which the logic device(s) 15 of the currently utilized embodiment operate is further such that, if and when the park-brake-set indicator 17 is activated and the logic device(s) 15 produce a park-brake-released signal, the logic device(s) 15 deactivate the park-brake-set indicator 17 and cause the park-brake-set indicator 17 to remain deactivated until the logic device(s) 15 next produce a park-brake-set signal. Of course it should be understood that in some cases different actions are required to cause one park-brake-set indicator 17 to remain activated or deactivated than are required to cause other constructions of a park-brake-set indicator 17 to remain activated or deactivated. For instance, some park-brake-set indicators 17 are constructed and interacted with the logic device(s) 15 and other components of the vehicle 10 in such a manner that it is required that an activation signal be constantly communicated to the park-brake-set indicator 17 in order to cause the park-brake-set indicator 17 to remain activated. In other embodiments a park-brake-set indicator 17 is constructed and interacted with the logic device(s) 15 and other components of the vehicle 10 in such a manner that a momentary communication to the park-brake-set indicator 17 of an activation signal by the logic device(s) 15 will cause the park-brake-set indicator 17 to become activated and the park-brake-set indicator 17 will thereafter remain activated until the logic device(s) 15 communicate a deactivation signal to the park-brake-set indicator 17. Analogous examples of how different constructions of park-brake-set indicators 17 may be caused to remain deactivated also exist, but will not be discussed in detail in this disclosure.

As is also mentioned above, in some embodiments of the present invention, including the currently utilized embodiment of the present invention, a park-brake monitoring-system 12 may comprise a park-brake system/park-brake monitoring-system malfunction-indicator 38 that may be activated in order to indicate to an operator of the vehicle 10 that the park-brake system 11 and/or the park-brake monitoring-system 12 has malfunctioned. In the currently utilized embodiment of the present invention the logic device(s) 15 of the park-brake monitoring-system 15 are communicatively linked to the park-brake system/park-brake monitoring-system malfunction-indicator 38 in such a manner that the logic device(s) 15 can activate the park-brake system/park-brake monitoring-system malfunction-indicator 38. In the currently utilized embodiment of the present invention the logic according to which the logic device(s) 15 operate is further such that, when the logic device(s) 15 produce a monitoring signal that is an error signal, the logic device(s) 15 activate the park-brake system/park-brake monitoring-system malfunction-indicator 38 to indicate to an operator of the vehicle 10 that the park-brake system 11 and/or the park-brake monitoring-system 12 has malfunctioned.

Those skilled in the art will appreciate that modifications could be made to the invention as described and in some instances some features of the invention will be employed without a corresponding use of other features without departing from the spirit and scope of the invention and thus the scope of the invention is limited only by the following claims.

We claim:

1. A vehicle, comprising:
   (a) one or more frame structures to which a majority of other components of said vehicle are engaged directly or indirectly and which functions to locate said other components of said vehicle relative to one another;
   (b) a suspension system that is engaged to and supports said one or more frame structures;
   (c) wherein said suspension system comprises one or more ground-engaging components that are rotatable relative to said one or more frame structures of said vehicle, at least when certain subsystems of said vehicle have certain operating states, and that provide said vehicle with a relatively low resistance to movement along the ground when they are rotatable relative to said one or more frame structures;
   (d) one or more body structures that are engaged directly or indirectly to and supported by said one or more frame structures and upon or within which occupants and/or cargo of said vehicle may reside;
   (e) a park-brake system that is constructed in such a manner that, when it has a park-brake fully-set operating state, said park-brake system prevents rotation of one or more of said ground-engaging components relative to said one or more frame structures;
   (f) wherein said park-brake system is further constructed such that when it has a park-brake fully-released operating state said park-brake system does not prevent rotation of any of said ground-engaging components relative to said one or more frame structures;
   (g) wherein said park-brake system comprises park-brake-actuating components that retract and actuate one another and braking components of said park-brake system in order to transition said park-brake system between said park-brake fully-set-operating state and said park-brake fully-released operating state;
   (h) wherein said park-brake system further comprises park-brake-system controls that are operable by an operator of said vehicle to effect actuation and retraction of said park-brake-actuating components;
   (i) a park-brake monitoring-system that comprises one or more operating-state sensors that sense the value of one or more set-degree-dependent parameters of said park-brake system and produce and communicate to other components of said vehicle sensed operating-state signals in a manner that is dependent upon said value of said set-degree-dependent parameters that said operating-state sensors sense;
   (j) wherein one or more of said set-degree-dependent parameters, upon which said manner of production and communication of said sensed operating-state signals is dependent, is a set-degree-dependent parameter that may have, at any given time, any one of a plurality of values which include one or more park-brake fully-set values, one or more park-brake not-fully-released/not-fully-set values, and one or more park-brake fully-released values;
   (k) wherein said operating-state sensors include at least one complimentary pair of a full-release-detection sensor and a full-set-detection sensor;
   (l) wherein each of said full-release-detection sensors senses a value of one of said set-degree-dependent parameters and produces and communicates sensed operating-state signals in a manner dependent upon said value of said set-degree-dependent parameter that it senses;
   (m) wherein each of said full-set-detection sensors senses a value of one of said set-degree-dependent parameters and produces and communicates sensed operating-state signals in a manner dependent upon said value of said set-degree-dependent parameter that it senses;
   (n) wherein each of said full-release-detection sensors is configured and interacted with said park-brake system in such a manner that it produces and communicates a park-brake fully-released signal to other components of said vehicle when said set-degree-dependent parameter said value of which it senses has at least certain ones of its park-brake fully-released values;
   (o) wherein each of said full-set-detection sensors is configured and interacted with said park-brake system in such a manner that it produces and communicates a park-brake fully-set signal to other components of said vehicle when said set-degree-dependent parameter said value of which it senses has at least certain ones of its park-brake fully-set values;
   (p) wherein each of said complimentary pairs of a full-release-detection sensor and a full-set-detection sensor is configured and interacted with said park-brake system in such a manner that there exist circumstances during normal, non-malfunctioning operation of said park-brake system and said park-brake monitoring-system during which said set-degree-dependent parameters, said values of which said full-release-detection sensor and said full-set-detection sensor sense, have/has park-brake not-fully-released/not-fully-set values and said full-release-detection sensor does not produce a park-brake fully-released signal and said full-set-detection sensor does not produce a park-brake fully-set signal.

2. The vehicle of claim 1, wherein:
   (a) said park-brake monitoring-system further comprises one or more logic devices to which one or more of said complimentary pairs of a full-release-detection sensor and a full-set-detection sensor are communicatively linked;
   (b) said logic devices and logic according to which they operate are configured in such a manner that said logic devices perform the steps of:

subsequent to an initiation of operation of said park-brake monitoring-system, if one of said full-release-detection sensors produces and communicates to said logic devices an uncontested park-brake fully-released signal before any of said full-set-detection sensors produces and communicates to said logic devices an uncontested park-brake fully-set signal, producing an initial monitoring signal that is a park-brake-released signal;

subsequent to an initiation of operation of said park-brake monitoring-system, if one of said full-set-detection sensors produces and communicates to said logic devices an uncontested park-brake fully-set signal before any of said full-release-detection sensors produces and communicates to said logic devices an uncontested park-brake fully-released signal, producing an initial monitoring signal that is a park-brake-set signal;

subsequent to any production of a monitoring signal that is a park-brake-released signal, producing a monitoring signal that is a park-brake-set signal, when and only when one of said full-set-detection sensors subsequently produces and communicates to said logic devices an uncontested park-brake fully-set signal; and subsequent to any production of a monitoring signal that is a park-brake-set signal, producing a monitoring signal that is a park-brake-released signal, when and only when one of said full-release-detection sensors subsequently produces and communicates to said logic devices an uncontested park-brake fully-released signal.

3. The vehicle of claim 2, wherein:
(a) said logic devices and logic according to which they operate are configured in such a manner that said logic devices perform the step of:
  if one of said complimentary pairs of a full-release-detection sensor and a full-set-detection sensor simultaneously produce and communicate to said logic devices both a park-brake fully-released signal and a park-brake fully-set signal, producing a monitoring signal that is an error signal.

4. The vehicle of claim 3, wherein:
(a) said logic devices and logic according to which they operate are configured in such a manner that said logic devices perform the step of:
  if, during a period of operation of said park-brake monitoring-system in which an operator of said vehicle has not utilized an operator interface to change a selected operating state of said park-brake system, one of said complimentary pairs of a full-release-detection sensor and a full-set-detection sensor do not produce and communicate to said logic devices at least one park-brake fully-released signal or park-brake fully-set signal for a period of time equal to or greater than a malfunction-verification period, producing a monitoring signal that is an error signal.

5. The vehicle of claim 4, wherein:
(a) said park-brake monitoring-system further comprises a park-brake-set indicator that is communicatively linked to said logic devices in such a manner that said logic devices can activate said park-brake-set indicator to indicate to an operator of said vehicle that said park-brake system has a park-brake fully-set operating state;
(b) said logic devices and logic according to which they operate are configured in such a manner that said logic devices perform the steps of:
  anytime one of said monitoring signals that is a park-brake-set signal is produced, activating said park-brake-set indicator and causing said park-brake-set indicator to remain activated until one of said monitoring signals that is a park-brake-released signal is subsequently produced or operation of said park-brake monitoring-system is terminated; and
  anytime said park-brake-set indicator is activated and one of said monitoring signals that is a park-brake released signal is produced, deactivating said park-brake-set indicator and causing said park-brake-set indicator to remain deactivated until one of said monitoring signals that is a park-brake-set signal is subsequently produced.

6. The vehicle of claim 5, wherein:
(a) said park-brake monitoring-system further comprises one or more park-brake system/park-brake monitoring-system malfunction-indicators that is/are communicatively linked to said one or more logic devices in such a manner that said logic devices can activate said park-brake system/park-brake monitoring-system malfunction-indicator to indicate to a user of said vehicle that said park-brake system and/or said park-brake monitoring-system has malfunctioned; and
(b) said one or more logic devices of said park-brake monitoring-system operate in accordance with logic that cause it/them to operate in such a manner that it/they perform the step of:
  activating one or more of said one or more park-brake system/park-brake monitoring-system malfunction-indicators anytime one of said monitoring signals that is an error signal is produced.

7. The vehicle of claim 6, wherein:
(a) one or more of said set-degree-dependent parameters said value of which either one of said full-release-detection sensors or one of said full-set-detection sensors senses is a set-degree-dependent parameter that is a position of one or more of said park-brake-actuating components, a fluid pressure of a working fluid of said park-brake system, or a voltage of a control circuit of said park-brake system.

8. The vehicle of claim 7, wherein:
(a) said park-brake system comprises a park-brake-actuating component that is a powered actuator that is driven by working fluid of said park-brake system to actuate and/or retract other park-brake-actuating components of said park-brake system; and
(b) one of said set-degree-dependent parameters of said park-brake system is a fluid pressure of said working fluid that drives said powered actuator and one or more of said one or more full-release-detection sensors and/or full-set-detection sensors is a fluid-pressure sensor that senses said fluid pressure of said working fluid and produces and communicates said sensed operating-state signals produced and communicated thereby in a manner dependent upon said fluid pressure of said working fluid.

9. The vehicle of claim 8, wherein:
(a) at least one of said complimentary pairs of a full-release-detection sensor and a full-set-detection sensor comprise a full-release-detection sensor and a full-set-detection sensor that are separate and distinct components from one another and that sense values of different set-degree-dependent parameters of said park-brake system.

10. The vehicle of claim 9, wherein:
(a) one of said set-degree-dependent parameters of said park-brake system is a position of one of said park-brake-actuating components of said park-brake system and one of said full-release-detection sensors or one of said full-set-detection sensors is a position sensor that senses said position of said park-brake-actuating component and produces and communicates said sensed operating-state signals in a manner dependent upon said position of said park-brake-actuating component.

11. The vehicle of claim 10, wherein:
(a) said fluid-pressure sensor is a fluid-pressure-activated switch that is constructed and communicatively linked to said logic devices in such a manner that when said pressure of said working fluid is below a switch-trigger pressure of said fluid-pressure-activated switch said fluid-pressure-activated switch produces and communicates to said logic devices either a logic low signal or a logic high signal and when said fluid pressure of said working fluid is above said switch-trigger pressure of said fluid-pressure-activated switch said fluid-pressure-activated switch produces and communicates to said logic devices whichever of a logic low signal and a logic high signal it does not produce and communicate to said logic devices when said fluid pressure of said working fluid is below said switch-trigger pressure of said fluid-pressure-activated switch;
(b) said switch-trigger pressure of said fluid-pressure-activated switch is equal to a boundary-value of said fluid pressure of said working fluid; and
(c) said boundary-value of said fluid pressure that said switch-trigger pressure of said fluid-pressure-activated switch is equal to is either a boundary-value between park-brake fully-released values and park-brake not-fully-released/not-fully-set values of said fluid pressure or is a boundary value between park-brake fully-set values and park-brake not-fully-released/not-fully-set values of said fluid pressure.

12. The vehicle of claim 11, wherein:
(a) said position sensor is a binary-digital position-sensor that is constructed and interacted with said park-brake-actuating component said position of which it senses in such a manner that, when said position of said park-brake-actuating component is within a range disposed upon a first side of a switch-trigger position of said park-brake-actuating component relative to said binary-digital position-sensor, said binary-digital position-sensor produces and communicates to said logic devices either a logic low signal or a logic high signal and, when said position of said park-brake-actuating component is within a range disposed upon a second side of said switch-trigger position of said park-brake-actuating component relative to said binary-digital position-sensor, said binary-digital position-sensor produces and communicates to said logic devices whichever of a logic low signal and a logic high signal it does not produce and communicate to said logic devices when said position of said park-brake-actuating component is disposed within said range of positions upon said first side of said switch-trigger position of said park-brake-actuating component relative to said binary-digital position-sensor;
(b) said switch-trigger position of said park-brake-actuating component relative to said binary-digital position-sensor is equal to a boundary-value of said position of said park-brake-actuating component; and
(c) said boundary-value of said park-brake-actuating component that said switch-trigger position of said park-brake-actuating component relative to said binary-digital position-sensor is equal to is either a boundary-value between park-brake fully-released values and park-brake not-fully-released/not-fully-set values of said position of said park-brake-actuating component or is a boundary value between park-brake fully-set values and park-brake not-fully-released/not-fully-set values of said position of said park-brake-actuating component.

13. The vehicle of claim 2, wherein:
(a) said park-brake monitoring-system further comprises a park-brake-set indicator that is communicatively linked to said logic devices in such a manner that said logic devices can activate said park-brake-set indicator to indicate to an operator of said vehicle that said park-brake system has a set operating state;
(b) said logic devices and logic according to which they operate are configured in such a manner that said logic devices perform the steps of:
anytime one of said monitoring signals that is a park-brake-set signal is produced, activating said park-brake-set indicator and causing said park-brake-set indicator to remain activated until one of said monitoring signals that is a park-brake-released signal is subsequently produced or operation of said park-brake monitoring-system is terminated; and
anytime said park-brake-set indicator is activated and one of said monitoring signals that is a park-brake-released signal is produced, deactivating said park-brake-set indicator and causing said park-brake-set indicator to remain deactivated until one of said monitoring signals that is a park-brake-set signal is subsequently produced.

14. The vehicle of claim 2, wherein:
(a) at least one of said complimentary pairs of a full-release-detection sensor and a full-set-detection sensor comprises a full-release-detection sensor and a full-set-detection sensor that are separate and distinct components from one another and that sense values of different set-degree-dependent parameters of said park-brake system.

15. The vehicle of claim 2, wherein:
(a) said park-brake system comprises a park-brake-actuating component that is a powered actuator that is driven by working fluid of said park-brake system to actuate and/or retract other park-brake-actuating components of said park-brake system; and
(b) one of said set-degree-dependent parameters of said park-brake system is a fluid pressure of said working fluid that drives said powered actuator and one or more of said one or more full-release-detection sensors and/or full-set-detection sensors is a fluid-pressure sensor that senses said fluid pressure of said working fluid and produces and communicates said sensed operating-state signals produced and communicated thereby in a manner dependent upon said fluid pressure of said working fluid.

16. The vehicle of claim 15, wherein:
(a) at least one of said complimentary pairs of a full-release-detection sensor and a full-set-detection sensor comprise a full-release-detection sensor and a full-set-detection sensor that are separate and distinct components from one another and that sense values of different set-degree-dependent parameters of said park-brake system.

17. The vehicle of claim 16, wherein:
(a) one of said set-degree-dependent parameters of said park-brake system is a position of one of said park-brake-actuating components of said park-brake system and one of said full-release-detection sensors and/or one of said full-set-detection sensors is a position sensor that senses said position of said park-brake-actuating component and produces and communicates said sensed operating-state signals in a manner dependent upon said position of said park-brake-actuating component.

18. The vehicle of claim 17, wherein:
(a) said position sensor is a binary-digital position-sensor that is constructed and interacted with said park-brake-actuating component said position of which it senses in such a manner that, when said position of said park-brake-actuating component is within a range disposed upon a first side of a switch-trigger position of said park-brake-actuating component relative to said binary-digital position-sensor, said binary-digital position-sensor produces and communicates to said logic devices either a logic low signal or a logic high signal and, when said position of said park-brake-actuating component is within a range disposed upon a second side of said switch-trigger position of said park-brake-actuating component relative to said binary-digital position-sensor, said binary-digital position-sensor produces and communicates to said logic devices whichever of a logic low signal and a logic high signal it does not produce and communicate to said logic devices when said position of said park-brake-actuating component is disposed within said range of positions upon said first side of said switch-trigger position of said park-brake-actuating component relative to said binary-digital position-sensor;
(b) said switch-trigger position of said park-brake-actuating component relative to said binary-digital position-sensor is equal to a boundary-value of said position of said park-brake-actuating component; and
(c) said boundary-value of said park-brake-actuating component that said switch-trigger position of said park-brake-actuating component relative to said binary-digital position-sensor is equal to is either a boundary-value between park-brake fully-released values and park-brake not-fully-released/not-fully-set values of said position of said park-brake-actuating component or is a boundary value between park-brake fully-set values and park-brake not-fully-released/not-fully-set values of said position of said park-brake-actuating component.

19. The vehicle of claim 18, wherein:
(a) said fluid-pressure sensor is a fluid-pressure-activated switch that is constructed and communicatively linked to said logic devices in such a manner that when said pressure of said working fluid is below a switch-trigger pressure of said fluid-pressure-activated switch said fluid-pressure-activated switch produces and communicates to said logic devices either a logic low signal or a logic high signal and when said fluid pressure of said working fluid is above said switch-trigger pressure of said fluid-pressure-activated switch said fluid-pressure-activated switch produces and communicates to said logic devices whichever of a logic low signal and a logic high signal it does not produce and communicate to said logic devices when said fluid pressure of said working fluid is below said switch-trigger pressure of said fluid-pressure-activated switch;
(b) said switch-trigger pressure of said fluid-pressure-activated switch is equal to a boundary-value of said fluid pressure of said working fluid; and
(c) said boundary-value of said fluid pressure that said switch-trigger pressure of said fluid-pressure-activated switch is equal to is either a boundary-value between park-brake fully-released values and park-brake not-fully-released/not-fully-set values of said fluid pressure or is a boundary value between park-brake fully-set values and park-brake not-fully-released/not-fully-set values of said fluid pressure.

20. The vehicle of claim 15, wherein:
(d) said fluid-pressure sensor is a fluid-pressure-activated switch that is constructed and communicatively linked to said logic devices in such a manner that when said pressure of said working fluid is below a switch-trigger pressure of said fluid-pressure-activated switch said fluid-pressure-activated switch produces and communicates to said logic devices either a logic low signal or a logic high signal and when said fluid pressure of said working fluid is above said switch-trigger pressure of said fluid-pressure-activated switch said fluid-pressure-activated switch produces and communicates to said logic devices whichever of a logic low signal and a logic high signal it does not produce and communicate to said logic devices when said fluid pressure of said working fluid is below said switch-trigger pressure of said fluid-pressure-activated switch;
(e) said switch-trigger pressure of said fluid-pressure-activated switch is equal to a boundary-value of said fluid pressure of said working fluid; and
(f) said boundary-value of said fluid pressure that said switch-trigger pressure of said fluid-pressure-activated switch is equal to is either a boundary-value between park-brake fully-released values and park-brake not-fully-released/not-fully-set values of said fluid pressure or is a boundary value between park-brake fully-set values and park-brake not-fully-released/not-fully-set values of said fluid pressure.

21. The vehicle of claim 15, wherein:
(a) one of said fluid-pressure sensors is one of said full-set-detection sensors of said park-brake monitoring-system.

22. The vehicle of claim 21, wherein:
(a) one or more of said fluid-pressure sensors that are full-set-detection sensors is a fluid-pressure-activated switch that is constructed and communicatively linked to said logic devices in such a manner that when said pressure of said working fluid is below a switch-trigger pressure of said fluid-pressure-activated switch said fluid-pressure-activated switch produces and communicates to said logic devices either a logic low signal or a logic high signal and when said fluid pressure of said working fluid is above said switch-trigger pressure of said fluid-pressure-activated switch said fluid-pressure-activated switch produces and communicates to said logic devices whichever of a logic low signal and a logic high signal it does not produce and communicate to said logic devices when said fluid pressure of said working fluid is below said switch-trigger pressure of said fluid-pressure-activated switch;
(b) said switch-trigger pressure of said fluid-pressure-activated switch is equal to a boundary-value of said fluid pressure of said working fluid; and
(c) said boundary-value of said fluid pressure that said switch-trigger pressure of said fluid-pressure-activated switch is equal to is a boundary-value between park-brake fully-set values and park-brake not-fully-released/not-fully-set values of said fluid pressure.

23. The vehicle of claim 2, wherein:

(a) one of said set-degree-dependent parameters of said park-brake system is a position of one of said park-brake-actuating components of said park-brake system and one of said full-release-detection sensors and/or one of said full-set-detection sensors is a position sensor that senses said position of said park-brake-actuating component and produces and communicates said sensed operating-state signals in a manner dependent upon said position of said park-brake-actuating component.

24. The vehicle of claim 23, wherein:

(a) said position sensor is a binary-digital position-sensor that is constructed and interacted with said park-brake-actuating component said position of which it senses in such a manner that, when said position of said park-brake-actuating component is within a range disposed upon a first side of a switch-trigger position of said park-brake-actuating component relative to said binary-digital position-sensor, said binary-digital position-sensor produces and communicates to said logic devices either a logic low signal or a logic high signal and, when said position of said park-brake-actuating component is within a range disposed upon a second side of said switch-trigger position of said park-brake-actuating component relative to said binary-digital position-sensor, said binary-digital position-sensor produces and communicates to said logic devices whichever of a logic low signal and a logic high signal it does not produce and communicate to said logic devices when said position of said park-brake-actuating component is disposed within said range of positions upon said first side of said switch-trigger position of said park-brake-actuating component relative to said binary-digital position-sensor;

(b) said switch-trigger position of said park-brake-actuating component relative to said binary-digital position-sensor is equal to a boundary-value of said position of said park-brake-actuating component; and (c) said boundary-value of said position of said park-brake-actuating component that said switch-trigger position of said park-brake-actuating component relative to said binary-digital position-sensor is equal to is either a boundary-value between park-brake fully-released values and park-brake not-fully-released/not-fully-set values of said position of said park-brake-actuating component or is a boundary value between park-brake fully-set values and park-brake not-fully-released/not-fully-set values of said position of said park-brake-actuating component.

25. The vehicle of claim 2, wherein:

(a) one or more of said full-set-detection sensors is a binary-digital sensor that is constructed and interacted with said park-brake system in such a manner that when said set-degree-dependent parameter, said value of which said binary-digital sensor that is said full-set-detection sensor senses, has park-brake fully-set values, said binary-digital sensor that is said full-set-detection sensor produces and communicates a logic low signal or logic high signal to other components of said vehicle; and (b) said full-set-detection sensor that is a binary-digital sensor is further constructed and interacted with said park-brake system in such a manner that when said set-degree-dependent parameter, said value of which said binary-digital sensor that is said full-set-detection sensor senses, has park-brake not-fully-released/not-fully-set values, said binary-digital sensor that is said full-set-detection sensor produces and communicates to other components of said vehicle whichever of a logic low signal and logic high signal it does not produce and communicate thereto when said set-degree-dependent parameter has park-brake fully-set values.

26. The vehicle of claim 25, wherein:

(a) one or more of said full-release-detection sensors is a binary-digital sensor that is constructed and interacted with said park-brake system in such a manner that when said set-degree-dependent parameter, said value of which said binary-digital sensor that is said full-release-detection sensor senses, has park-brake fully-released values, said binary-digital sensor that is said full-release-detection sensor produces and communicates a logic low signal or logic high signal to other components of said vehicle; and (b) said full-release-detection sensor that is a binary-digital sensor is further constructed and interacted with said park-brake system in such a manner that when said set-degree-dependent parameter, said value of which said binary-digital sensor that is said full-release-detection sensor senses, has park-brake not-fully-released/not-fully-set values, said binary-digital sensor that is said full-release-detection sensor produces and communicates to other components of said vehicle whichever of a logic low signal and logic high signal it does not produce and communicate thereto when said set-degree-dependent parameter has park-brake fully-released values.

27. The vehicle of claim 2, wherein:

(a) one or more of said full-release-detection sensors is a binary-digital sensor that is constructed and interacted with said park-brake system in such a manner that when said set-degree-dependent parameter, said value of which said binary-digital sensor that is said full-release-detection sensor senses, has park-brake fully-released values, said binary-digital sensor that is said full-release-detection sensor produces and communicates a logic low signal or logic high signal to other components of said vehicle; and (b) said full-release-detection sensor that is a binary-digital sensor is further constructed and interacted with said park-brake system in such a manner that when said set-degree-dependent parameter, said value of which said binary-digital sensor that is said full-release-detection sensor senses, has park-brake not-fully-released/not-fully-set values, said binary-digital sensor that is said full-release-detection sensor produces and communicates to other components of said vehicle whichever of a logic low signal and logic high signal it does not produce and communicate thereto when said set-degree-dependent parameter has park-brake fully-released values.

28. The vehicle of claim 2, wherein:

(a) one or more full-set-detection sensors, of one or more of said complimentary pairs of a full-release-detection sensor and a full-set-detection sensor, produces and communicates to said logic devices park-brake not-fully-set signals when a set-degree-dependent parameter said value of which said full-set-detection sensor senses has park-brake not-fully-released/not-fully-set values;

(b) one or more full-release-detection sensors, that is a full-release-detection sensor of a same complimentary pair of a full-release-detection sensor and a full-set-detection sensor as one of said full-set-detection sensors that produces park-brake not-fully-set signals, produces and communicates to said logic devices park-brake not-fully-released signals when a set-degree-dependent parameter said value of which said full-release-detection sensor senses has park-brake not-fully-released/not-fully-set values;

(c) said logic devices and logic according to which they operate are configured in such a manner that said logic devices perform the step of:

when a full-release-detection sensor and a full-set-detection sensor of a complimentary pair thereof simultaneously produce and communicate a park-brake not-fully-released signal and a park-brake not-fully-set signal to said logic devices for a period of time equal to or greater than a malfunction-verification check-period, producing a monitoring-signal that is an error signal.

29. The vehicle of claim 2, wherein:

(a) one or more full-set-detection sensors, of one or more of said complimentary pairs of a full-release-detection sensor and a full-set-detection sensor, produces and communicates to said logic devices park-brake not-fully-released/not-fully-set signals when a set-degree-dependent parameter said value of which said full-set-detection sensor senses has park-brake not-fully-released/not-fully-set values;

(b) one or more of said full-release-detection sensors, that is a full-release-detection sensor of a same complimentary pair of a full-release-detection sensor and a full-set-detection sensor as one of said full-set-detection sensors that produces park-brake not-fully-released/not-fully-set signals, produces and communicates to said logic devices park-brake not-fully-released/not-fully-set signals when a set-degree-dependent parameter said value of which said full-release-detection sensor senses has park-brake not-fully-released/not-fully-set values;

(c) said logic devices and logic according to which they operate are configured in such a manner that said logic devices perform the step of:

when a full-release-detection sensor and a full-set-detection sensor of a complimentary pair thereof simultaneously produce and communicate a park-brake not-fully-released/not-fully-set signal for a period of time equal to or greater than a malfunction-verification period, producing a monitoring-signal that is an error signal.

30. The vehicle of claim 2, wherein:

(a) said vehicle further comprises a service-brake system that comprises braking components; and (b) braking components of said park-brake system are separate and distinct components from said braking components of said service-brake system.

31. The vehicle of claim 1, wherein:

(a) said park-brake monitoring-system further comprises one or more logic devices;

(b) said logic devices and logic according to which they operate are configured in such a manner that said logic devices perform the steps of:

subsequent to an initiation of operation of said park-brake monitoring-system, if one or more of said full-release-detection sensors produces and communicates to said logic devices an uncontested park-brake fully-released signal before any of said full-set-detection sensors produce and communicate to said logic devices an uncontested park-brake fully-set signal, producing a monitoring signal that is a park-brake-released signal;

subsequent to an initiation of operation of said park-brake monitoring-system, if one or more of said full-set-detection sensors produces and communicates to said logic devices an uncontested park-brake fully-set signal before any of said full-release-detection sensors produces and communicates to said logic devices an uncontested park-brake fully-released signal, producing a monitoring signal that is a park-brake-set signal;

subsequent to any production of a monitoring signal that is a park-brake-released signal, producing a monitoring signal that is a park-brake-set signal, when and only when one or more of said full-set-detection sensors subsequently produces and communicates to said logic devices an uncontested park-brake fully-set signal; and subsequent to any production of a monitoring signal that is a park-brake-set signal, producing a monitoring signal that is a park-brake-released signal when one or more of said full-set-detection sensors produces and communicates to said logic devices a park-brake not-fully-set signal or a park-brake not-fully-released/not-fully-set signal or one or more of said full-release-detection sensors produces and communicates to said logic devices a park-brake not-fully-released/not-fully-set signal or a park-brake fully-released signal.

32. The vehicle of claim 1, wherein:

(a) said park-brake monitoring-system further comprises one or more logic devices;

(b) said logic devices and logic according to which they operate are configured in such a manner that said logic devices perform the steps of:

subsequent to an initiation of operation of said park-brake monitoring-system, if one or more of said full-set-detection sensors produces and communicates to said logic devices an uncontested park-brake fully-set signal before any of said full-release-detection sensors produce and communicate to said logic devices an uncontested park-brake fully-released signal, producing a monitoring signal that is a park-brake-set signal;

subsequent to an initiation of operation of said park-brake monitoring-system, if one or more of said full-release-detection sensors produces and communicates to said logic devices an uncontested park-brake fully-released signal before any of said full-set-detection sensors produces and communicates to said logic devices an uncontested park-brake fully-set signal, producing a monitoring signal that is a park-brake-released signal;

subsequent to any production of a monitoring signal that is a park-brake-set signal, producing a monitoring signal that is a park-brake-released signal, when and only when one or more of said full-release-detection sensors subsequently produces and communicates to said logic devices an uncontested park-brake fully-released signal; and subsequent to any production of a monitoring signal that is a park-brake-released signal, producing a monitoring signal that is a park-brake-set signal when one or more of said full-release-detection sensors produces and communicates to said logic devices a park-brake not-fully-released signal or a park-brake not-fully-released/not-fully-set signal or one or more of said full-set-detection sensors produces and communicates to said logic devices a park-brake not-fully-released/not-fully-set signal or a park-brake fully-set signal.

33. The vehicle of claim 2, wherein:
(a) one or more of said complimentary pairs of a full-release-detection sensor and a full-set-detection sensor consists of a single sensor that constitutes both said full-release-detection sensor and said full-set-detection sensor thereof;
(b) each of said single sensors that constitutes both a full-release-detection sensor and a full-set-detection sensor of one of said complimentary pairs thereof is constructed and interacted with said park-brake system in such a manner that it produces and communicates to said logic devices a park-brake not-fully-released/not-fully-set signal when a set-degree-dependent parameter a value of which said single sensor senses has park-brake not-fully-released/not-fully-set values;
(c) each of said single sensors that constitutes both a full-release-detection sensor and a full-set-detection sensor of one of said complimentary pairs thereof is constructed and interacted with said park-brake system in such a manner that it produces and communicates to said logic devices a park-brake fully-released signal when said set-degree-dependent parameter said value of which it senses has at least certain ones of its park-brake fully-released values; and
(d) each of said single sensors that constitutes both a full-release-detection sensor and a full-set-detection sensor of one of said complimentary pairs thereof is constructed and interacted with said park-brake system in such a manner that it produces and communicates to said logic devices a park-brake fully-set signal when said set-degree-dependent parameter said value of which it senses has at least certain ones of its park-brake fully-set values.

* * * * *